United States Patent
Kim et al.

(10) Patent No.: US 10,789,083 B2
(45) Date of Patent: Sep. 29, 2020

(54) PROVIDING A VIRTUAL DESKTOP SERVICE BASED ON PHYSICAL DISTANCE ON NETWORK FROM THE USER TERMINAL AND IMPROVING NETWORK I/O PERFORMANCE BASED ON POWER CONSUMPTION

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Hwaseong (KR); Jong-Bae Moon, Daejeon (KR); Myeong-Hoon Oh, Daejeon (KR); Byeong-Thaek Oh, Daejeon (KR); Soo-Cheol Oh, Daejeon (KR); Seong-Woon Kim, Gyeryong (KR); Ji-Hyeok Choi, Gunpo (KR); Hag-Young Kim, Daejeon (KR); Wan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/354,651

(22) Filed: Nov. 17, 2016

(65) Prior Publication Data
US 2017/0139738 A1 May 18, 2017

(30) Foreign Application Priority Data
Nov. 17, 2015 (KR) .................. 10-2015-0160829

(51) Int. Cl.
*G06F 9/455* (2018.01)
*G06F 9/451* (2018.01)
*G06F 9/445* (2018.01)

(52) U.S. Cl.
CPC .......... *G06F 9/45558* (2013.01); *G06F 9/452* (2018.02); *G06F 9/4451* (2013.01);
(Continued)

(58) Field of Classification Search
CPC ...... G06F 3/147; G06F 9/452; G06F 9/45558; G09G 2370/022; G09G 2370/042; H04L 69/04; H04L 67/025; H04L 67/2809
See application file for complete search history.

(56) References Cited

U.S. PATENT DOCUMENTS 8,707,397 B1 * 4/2014 Wilkinson ............. G06F 9/465
726/4
9,086,897 B2 7/2015 Oh et al.
(Continued)

FOREIGN PATENT DOCUMENTS

| EP | 2 466 818 A1 | 6/2012 |
| JP | 2001-282729 A | 10/2001 |

(Continued)

OTHER PUBLICATIONS

Aman Kansal et al., "Virtual Machine Power Metering and Provisioning", ACM Symposium on Cloud Computing (SOCC), Jun. 10-11, 2010, pp. 1-12.

Primary Examiner — Jorge A Chu Joy-Davila

(57) ABSTRACT

Disclosed herein are a method and apparatus for virtual desktop service. The apparatus includes a connection manager configured to perform an assignment task of assigning a virtual machine to a user terminal using virtual desktop service, a resource pool configured to allocate software resources to a virtual desktop, wherein the software resources include an OS, applications, and user profiles, and
(Continued)

a virtual machine infrastructure configured to support hardware resources including a CPU and a memory, wherein the connection manager is configured to perform a coordination task of coordinating a delivery protocol used between the user terminal and servers that provide the virtual desktop service, wherein the resource pool has a management function, wherein the management function is based on usage pattern information about a user's average usage of resources, and wherein the management function uses a physical distance on network from the user terminal to a server.

12 Claims, 17 Drawing Sheets

(52) U.S. Cl.
CPC ........... *G06F 2009/4557* (2013.01); *G06F 2009/45562* (2013.01); *G06F 2009/45583* (2013.01); *G06F 2009/45595* (2013.01); *Y02D 10/43* (2018.01)

(56) References Cited

U.S. PATENT DOCUMENTS

| | | | |
|---|---|---|---|
| 9,489,227 | B2 | 11/2016 | Oh et al. |
| 2009/0282404 | A1* | 11/2009 | Khandekar ......... G06F 9/45558 718/1 |
| 2010/0031259 | A1 | 2/2010 | Inoue |
| 2011/0225282 | A1 | 9/2011 | Hahm et al. |
| 2013/0318521 | A1* | 11/2013 | Monaghan ............ H04L 63/107 718/1 |
| 2013/0326512 | A1 | 12/2013 | Katz et al. |
| 2014/0200839 | A1* | 7/2014 | Doi ...................... G01R 21/133 702/60 |
| 2014/0237079 | A1 | 8/2014 | Lockerbie et al. |
| 2015/0026306 | A1 | 1/2015 | Moon et al. |
| 2015/0113528 | A1 | 4/2015 | Kim et al. |
| 2015/0121061 | A1* | 4/2015 | Goyal ..................... G06F 9/455 713/152 |
| 2015/0201004 | A1 | 7/2015 | Moon et al. |

FOREIGN PATENT DOCUMENTS

| | | |
|---|---|---|
| KR | 10-2006-0028525 A | 3/2006 |
| KR | 10-2008-0092908 A | 10/2008 |
| KR | 10-2008-0093978 A | 10/2008 |
| KR | 10-2008-0110894 A | 12/2008 |
| KR | 10-2009-0111576 A | 10/2009 |
| KR | 10-2010-0071690 A | 6/2010 |
| KR | 10-2010-0123847 A | 11/2010 |
| KR | 10-2011-0070297 A | 6/2011 |
| KR | 10-2011-0103889 A | 9/2011 |
| KR | 10-2012-0100927 A | 9/2012 |
| KR | 1020130007373 A | 1/2013 |
| KR | 1020140143953 A | 12/2014 |
| KR | 10-2015-0009662 A | 1/2015 |
| KR | 10-2015-0085309 A | 7/2015 |
| WO | WO 2007/069194 A1 | 6/2007 |
| WO | WO 2007/082097 A2 | 7/2007 |
| WO | WO 2007/121241 A2 | 10/2007 |
| WO | WO 2009/108579 A2 | 9/2009 |

\* cited by examiner

PROVIDING A VIRTUAL DESKTOP SERVICE BASED ON PHYSICAL DISTANCE ON NETWORK FROM THE USER TERMINAL AND IMPROVING NETWORK I/O PERFORMANCE BASED ON POWER CONSUMPTION

CROSS REFERENCE TO RELATED APPLICATION

This application claims the benefit of Korean Patent Application No. 10-2015-0160829, filed Nov. 17, 2015, which is hereby incorporated by reference in its entirety into this application.

BACKGROUND OF THE INVENTION

1. Technical Field

The present invention generally relates to an apparatus and method for virtual desktop service and, more particularly, to an apparatus and method for virtual desktop service, which perform server selection based on policies depending on a distance, network allocation and change policies, and power management policies when a server is selected.

2. Description of the Related Art

Recently, there has been a lot of research into and standardization of virtual desktop service, which is service for providing a hard disk for data storage, applications, or the like to an Internet space.

Korean Patent Application Publication Nos. 2010-0123847 and 2009-0111576 disclose virtual desktop service technology in detail. However, architecture for such virtual desktop service has not yet been standardized, and thus there is a limitation in that virtual desktop service cannot be efficiently provided to a user.

Virtual desktop service, which is service in which a hard disk for storing data, application programs, etc. are provided to an Internet space, enables a virtual machine running on a virtual desktop server to be used by connecting the virtual machine to a client system.

Meanwhile, in a typical server virtualization computing environment, virtual machines are assigned to users based on the performance and load of the resources (e.g. a CPU, memory, disk capacity, a network, etc.) of the server that implements virtualization. At this time, since the screens of virtual machines are remotely transmitted to users in virtual desktop service, the quality of service may vary due to network delays depending on the distances between distributed users and distributed virtualization servers. A plurality of servers that provide virtual machines in a distributed network environment may be locally concentrated or widely distributed and located in a wide area. When a plurality of servers are distributed and located in a wide area, a method for assigning virtual machines based on the loads on hardware resources encounters a limitation.

Further, server virtualization technology, which allows a single server to run a plurality of virtual machines by applying virtualization technology to servers, thus reducing hardware expenses, has been widely used. In such a server virtualization environment, network I/O virtualization technology is used in order for a plurality of virtual machines to share a single network card with each other. However, when network I/O virtualization is supported using software, sufficient network I/O performance cannot be provided.

Accordingly, virtualization-supporting methods using hardware have been proposed. As an example thereof, there is Single Root I/O Virtualization (SR-IOV) architecture. A network card to which the SR-IOV architecture is applied supports network I/O virtualization without the aid of software. Therefore, by means of the network card to which the SR-IOV architecture is applied, sufficient network I/O performance may be provided in a server virtualization environment.

Meanwhile, the methods for obtaining total server power that are generally and most widely used may be divided into a method for calculating power at a hard disk level and a method using a power calculation model at a simulation level.

The method for calculating power at the hard disk level is a method for calculating changes in data using a sensor or a measuring unit, and is capable of rapidly and precisely calculating such changes, but is disadvantageous in that it is possible to calculate only the power of the current system and it is difficult to analyze power or apply this method to power analysis projections in the future. Further, this method is inconvenient in that, in order to calculate power consumption in real time, a power calculation sensor device must always monitor the amount of power consumed by a server regardless of the operating status of the server. For this operation, a power calculation sensor must always be operated, that is, must be operated for 24 hours a day. This results in a problem of considerably increased power consumption because the amount of power consumed by the power calculation sensor for monitoring power consumption reaches a non-negligible state when the power consumption of the server is low and the time during which the server is used is greatly limited. In relation to this problem, Korean Patent Application Publication No. 10-2011-0070297 discloses technology entitled "Power metering devices and method for Retrench the power consumption using therefor". Meanwhile, the method for modeling a power calculation model at the simulation level is widely used because analysis and prediction are possible based on detailed information. However, problems arise in that there frequently occur the case where simulation requires analysis time from one hour or longer to one day or longer, in that changing or modifying the application software for performing the simulation requires professional knowledge, and in that, in some cases, a lot of time and expense is incurred for code refactoring when software is redesigned.

SUMMARY OF THE INVENTION

Accordingly, the present invention has been made keeping in mind the above problems occurring in the prior art, and an object of the present invention is to provide architecture that is capable of efficiently providing virtual desktop service.

Another object of the present invention is to provide virtual desktop service in consideration of the distance between a server for implementing virtualization and a user and the server usage pattern of the user.

A further object of the present invention is to provide a system for virtual desktop service and a method for providing the virtual desktop service using the system, which can further improve network I/O performance in a server virtualization environment which uses a network card to which virtualization-supporting architecture using hardware is applied.

Yet another object of the present invention is to provide a server power prediction apparatus and method using a virtual machine, which predict the total power consumption of a server by calculating the total power consumption of a virtual machine using power consumption rates and power consumption changes for respective components of the virtual machine, thus rapidly predicting a change or a transition in the power of the server without requiring a hard disk for calculating power.

In accordance with an aspect of the present invention to accomplish the above objects, there is provided an apparatus for virtual desktop service, including a connection manager configured to perform an assignment task of assigning a virtual machine to a user terminal that uses the virtual desktop service; a resource pool configured to allocate software resources to a virtual desktop, wherein the software resources include an operating system (OS), applications, and user profiles; and a virtual machine infrastructure configured to support hardware resources including a central processor unit (CPU) and a memory, wherein the connection manager is configured to perform a coordination task of coordinating a delivery protocol used between the user terminal and servers that provide the virtual desktop service, wherein the resource pool has a management function, wherein the management function is based on usage pattern information about a user's average usage of resources, and wherein the management function uses a physical distance on network from the user terminal to a server on the shortest path.

The connection manager may provide environment files with the user terminal, the environment files including an image of operating system (OS) which corresponds to a requirement configured by the user terminal, and the environmental files may be prepared in advance when the virtual desktop service is provided.

The virtual machine infrastructure may support high availability (HA) with predefined configuration parameters.

A plurality of virtual machines in the servers may be generated over a single hypervisor.

The delivery protocol may be used to encapsulate and deliver access to an entire information system environment or access to the user terminal over a network.

In accordance with another aspect of the present invention to accomplish the above objects, there is provided a virtual desktop service method, including checking, by a connection manager, user profiles of a user terminal for virtual desktop service and searching for a virtual machine suitable for hardware of the user terminal; requesting, by the connection manager, a virtual machine infrastructure to generate a corresponding virtual machine if the suitable virtual machine is not present and applying, by the connection manager, the user profiles to a corresponding virtual machine if the suitable virtual machine is present and generating a virtual desktop; and sending, by the connection manager, connection information for sending the generated virtual desktop to the user terminal and sending the virtual desktop to the user terminal using a delivery protocol of the virtual desktop, wherein a resource pool configured to allocate software resources to a virtual desktop, wherein the software resources include an operating system (OS), applications, and user profiles, wherein the virtual machine infrastructure configured to support hardware resources including a central processor unit (CPU) and a memory, wherein the connection manager is configured to perform a coordination task of coordinating a delivery protocol used between the user terminal and servers that provide the virtual desktop service, wherein the resource pool has a management function, wherein the management function is based on usage pattern information about a user's average usage of resources, and wherein the management function uses a physical distance on network from the user terminal to a server on the shortest path.

The connection manager may provide environment files with the user terminal, the environment files including an image of operating system (OS) which corresponds to a requirement configured by the user terminal, and wherein the environmental files may be prepared in advance when the virtual desktop service is provided.

The virtual machine infrastructure may support high availability (HA) with predefined configuration parameters.

A plurality of virtual machines in the servers may be generated over a single hypervisor.

The delivery protocol may be used to encapsulate and deliver access to an entire information system environment or access to the user terminal over a network.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
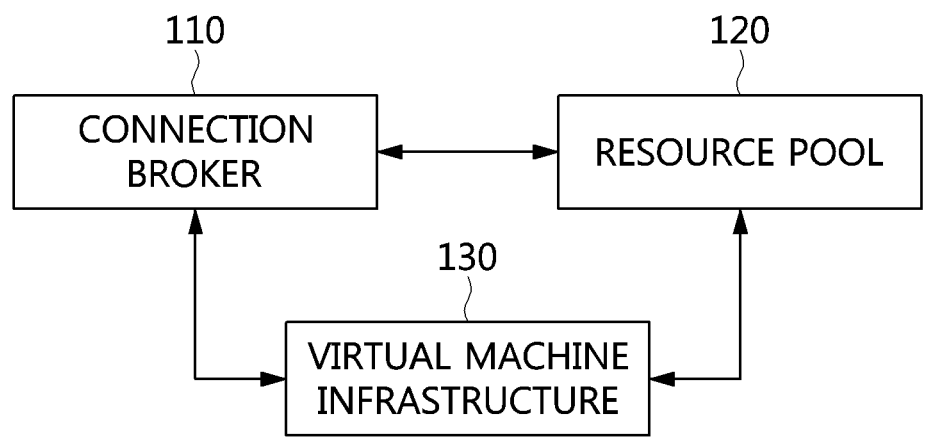
FIG. 1 is a diagram showing service architecture for virtual desktop service according to an embodiment of the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar components throughout the drawings. In the following description of the present invention, detailed descriptions of known functions and configurations which are deemed to make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. It should be understood that a representation indicating that a first component is "linked", "coupled", or "connected" to a second component includes not only the case where the first component is directly coupled or connected to the second component but also cases where a third component is "linked", "coupled" or "connected" between the first and second components.

FIG. 1 is a block diagram showing service architecture for virtual desktop service according to an embodiment of the present invention.

Several steps are performed in order for a service provider to provide the virtual desktop service to an end-user, and these steps may be performed by three principal actors, namely, a Connection Broker (CB) 110, a Resource Pool (RP) 120, and a Virtual Machine Infrastructure (VMI) 130, as shown in FIG. 1.

Figure 2:
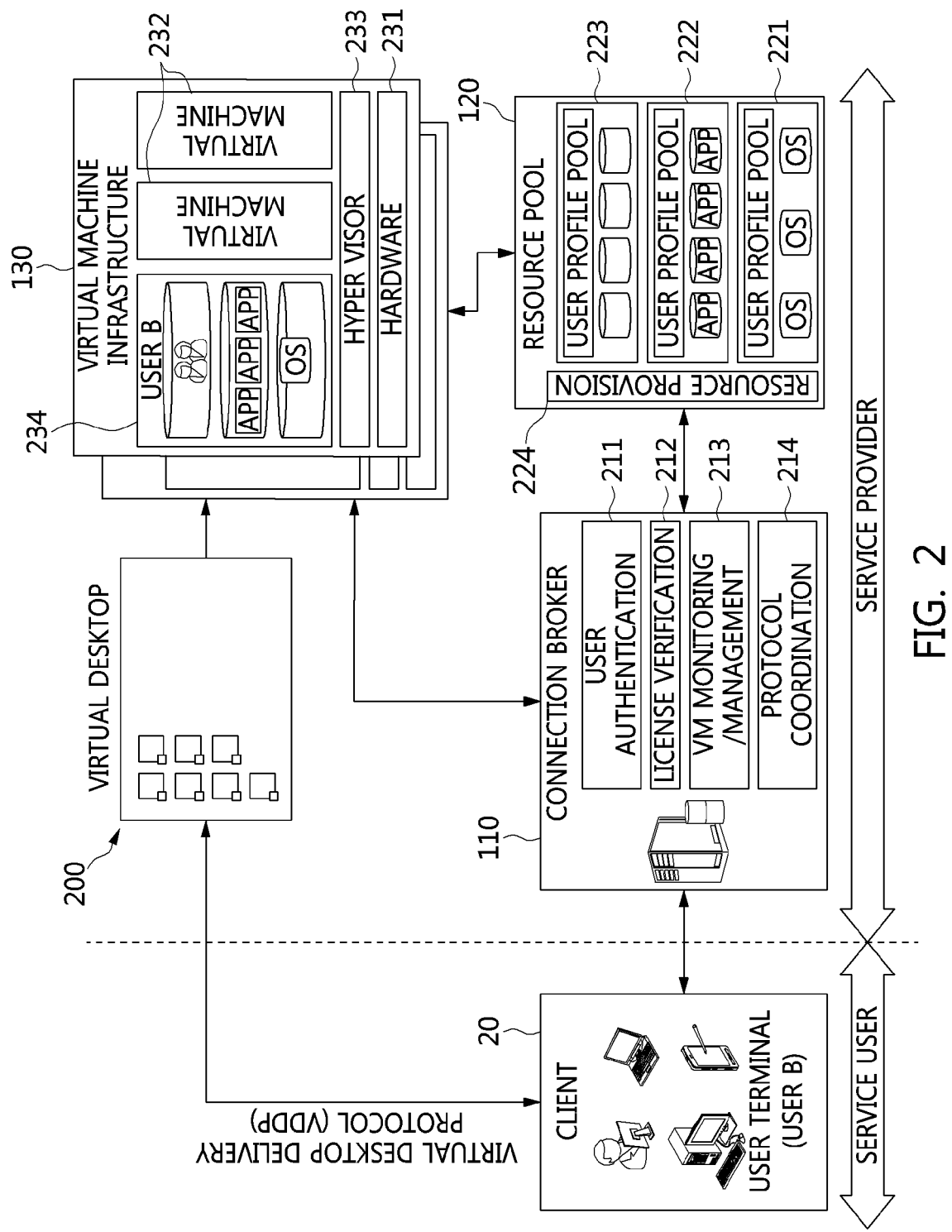
FIG. 2 is a conceptual diagram showing service architecture for virtual desktop service according to an embodiment of the present invention.

Below, the functions of the three principal actors will be described in detail with reference to FIG. 2. FIG. 2 is a conceptual diagram showing the service architecture for the virtual desktop service according to an embodiment of the present invention.

Referring to FIG. 2, the connection broker 110 may be a software program enabling a user terminal 20 to be connected to a virtual desktop 200, and may perform a user authentication function 211 and a license verification function 212 for validating the user terminal 20 and the software of the user terminal 20, a management/monitoring function 213 of managing a Virtual Machine (VM) assigned to the user terminal 20 and monitoring a server for measuring the activity level of the virtual machine, and a protocol coordination function 214 for allowing the same protocol to be used between the user terminal 20 and servers. This connection broker 110 may provide a connection between backup storage and virtual desktop servers.

Referring to FIG. 2, the resource pool 120 may manage three different types of high-capacity software resources, namely Operating Systems (OSs), applications, and user profiles, in order to provide an on-demand virtual desktop service. That is, as shown in FIG. 2, the resource pool 120 includes an OS pool 221, an application pool 222, and a user profile pool 223. The software resources managed by the resource pool 120 are transferred to a specific virtual machine at a predetermined time in a streaming form and are executed on the specific virtual machine.

Further, the resource pool 120 may provide provision information 224 related to relevant software resources at the request of the connection broker 110. The above-described user profiles may include, for example, individual pieces of information, such as a hardware configuration (e.g. a Central Processing Unit (CPU), Random Access Memory (RAM), Input/Output (I/O) devices, etc.), the OS that is used, a selected application, and the user's computing environment information (for example, display resolution, an Internet access scheme, etc.). Such user profiles may be managed for respective users.

Referring to FIG. 2, the virtual machine infrastructure 130 performs the principal functions of supporting hardware resources 231 and generating Virtual Machines (VMs) 232. For virtual desktop servers, a virtualization technology known as a hypervisor 233, for example, is absolutely necessary for the efficient use of the above-described hardware resources 231. The above-described hypervisor 233 abstracts the physical hardware resources 231 and dynamically allocates the physical hardware resources 231 to the higher level of the software 234.

That is, the hardware resources 231 supported by the virtual machine infrastructure 130 may be efficiently used depending on the hypervisor virtualization technology of the virtual desktop servers, which abstracts the physical hardware resources 231 and dynamically allocates them to the higher level of the software 234. Consequently, the virtual machine infrastructure 130 provides the virtual machines 232 on which the software 234 of the user terminal 20 runs. These virtual machines are called virtual desktops 200.

Figure 3:
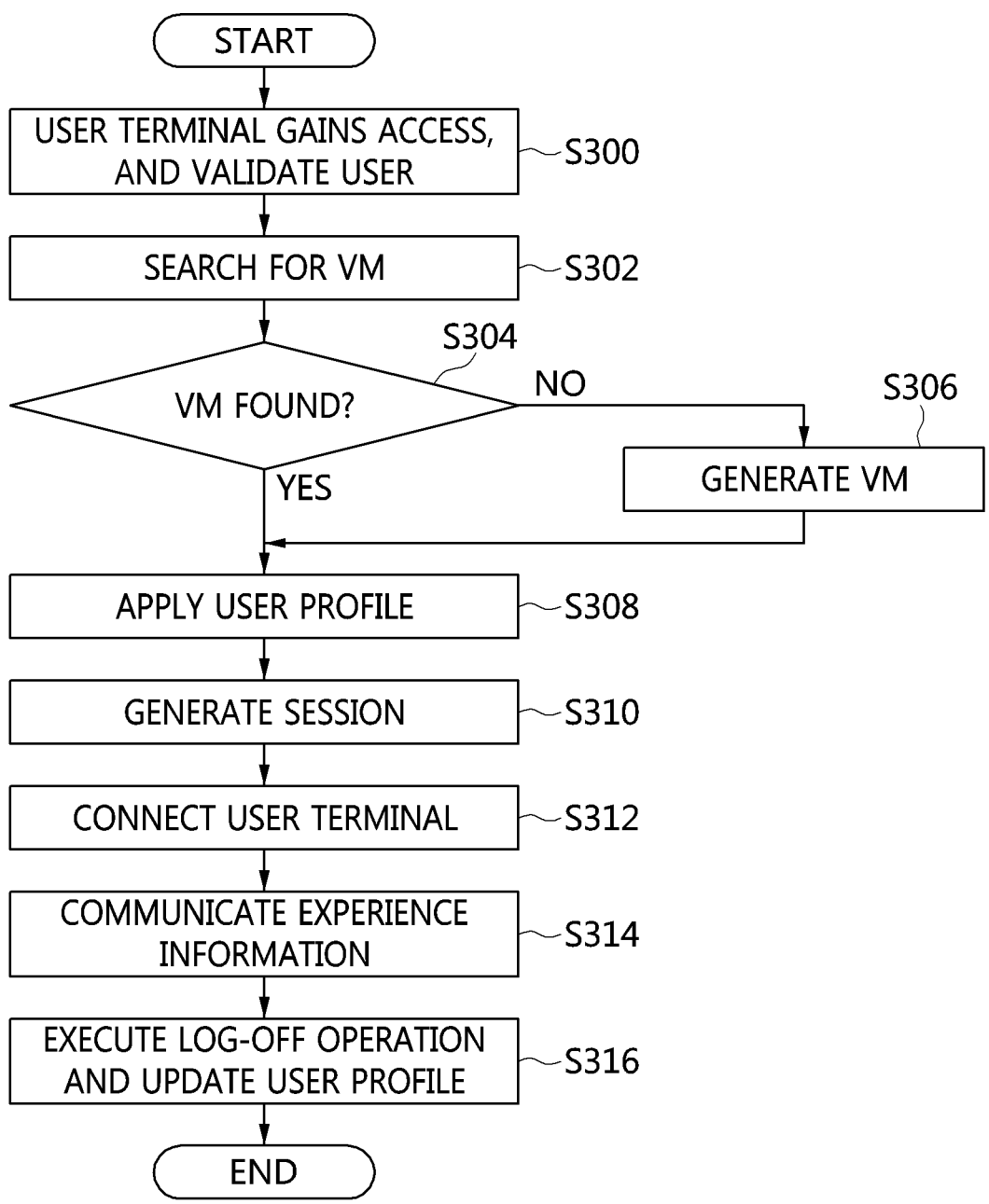
FIG. 3 is a flowchart showing a method for virtual desktop service according to an embodiment of the present invention.

Below, the method for the virtual desktop service will be described in detail with reference to FIG. 3, together with FIG. 2, in which a conceptual diagram of the service architecture for the virtual desktop service is illustrated. FIG. 3 is a flowchart showing the method for the virtual desktop service according to an embodiment of the present invention.

Referring to FIG. 3, the method for the virtual desktop service according to the embodiment of the present invention is performed to include a user terminal connection and user validation step S300, a virtual machine search step S302, a user profile application step S308, a session generation step S310, a user terminal connection step S312, an experience information communication step S314, and a log-off operation and user profile update step S316.

At the user terminal connection and user validation step S300, when the user terminal 20 accesses the virtual desktop service using one or more of the Secure Shell (SSH) and Transport Layer Security (TLS) security protocols, the connection broker 110 validates the relevant user using his or her user Identification (ID) and password. At the virtual machine search step S302, the connection broker 110 identifies the relevant user profile so as to assign a virtual machine and searches for a virtual machine that satisfies the hardware configuration of the user terminal 20 and that is optimal for the computing environment using a provisioning function.

As a result of searching performed at the virtual machine search step S302, whether a suitable virtual machine has been found is determined at step S304. If it is determined that no suitable virtual machine is present, the connection broker 110 requests the virtual machine infrastructure 130 to generate a virtual machine by transmitting information about the hardware configuration. Accordingly, the virtual machine infrastructure 130 generates a virtual machine at step S306.

At the user profile application step S308, after the virtual machine has been assigned or generated, the connection broker 110 applies the user profile to the assigned or generated virtual machine. At the user profile application step S308, the connection broker 110 may install an OS and an application required to construct the virtual desktop 200. At the session generation step S310, the session for which the virtual desktop 200 is to be delivered is initiated in the virtual machine infrastructure 130, and information about the generated session is dispatched to the connection broker 110. At the user terminal connection step S312, the connection broker 110 transmits the session information to the user terminal 20, and the user terminal 20 is connected to the virtual machine infrastructure 130.

At the experience information communication step S314, the user terminal 20 communicates information about the experience of users using the virtual desktop 200 on the basis of a Virtual Desktop Delivery Protocol (VDDP). At the log-off operation and user profile update step S316, the user terminal 20 executes a log-off operation so as to prevent user data from being lost when the virtual desktop service is terminated, and the connection broker 110 updates the changed user profile in the user profile pool 223 during the execution of the log-off operation. Also, at the log-off operation and user profile update step S316, the connection broker 110 may return the relevant virtual machine, thereby making the virtual machine available.

Figure 4:
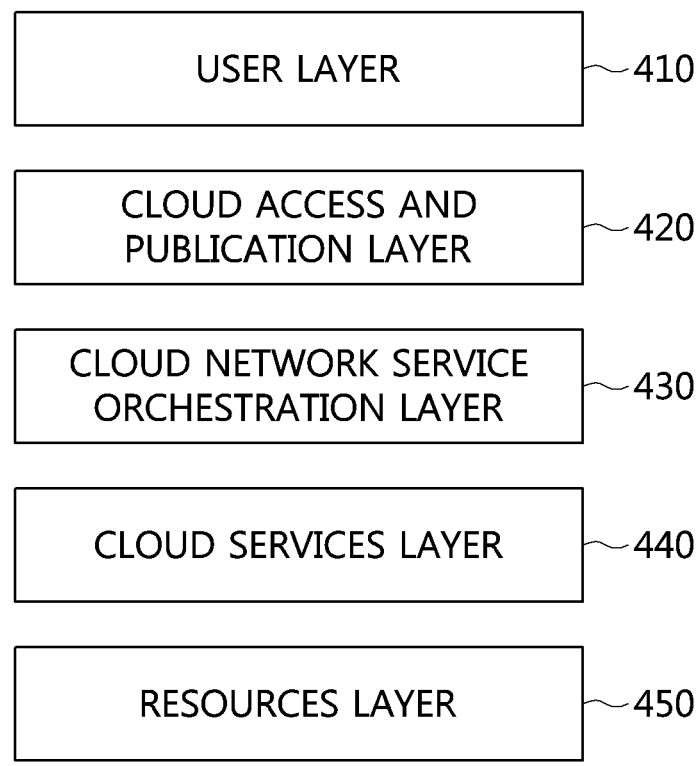
FIG. 4 is a diagram showing functional layered architecture for virtual desktop service according to an embodiment of the present invention.

Below, the functional layers of the virtual desktop service according to an embodiment of the present invention will be described in detail with reference to FIGS. 4 and 5. FIG. 4 is a diagram showing a functional layered architecture for the virtual desktop service according to an embodiment of the present invention.

Referring to FIG. 4, the functional layered architecture for the virtual desktop service according to the embodiment of the present invention includes functional layers such as a user layer 410, a cloud access and publication layer 420, a cloud network service orchestration layer 430, a cloud services layer 440, and a resources layer 450.

The above-described functional layers will be individually described below with reference to FIG. 5. FIG. 5 is a diagram showing the functional layered architecture for the virtual desktop service according to an embodiment of the present invention.

Figure 5:
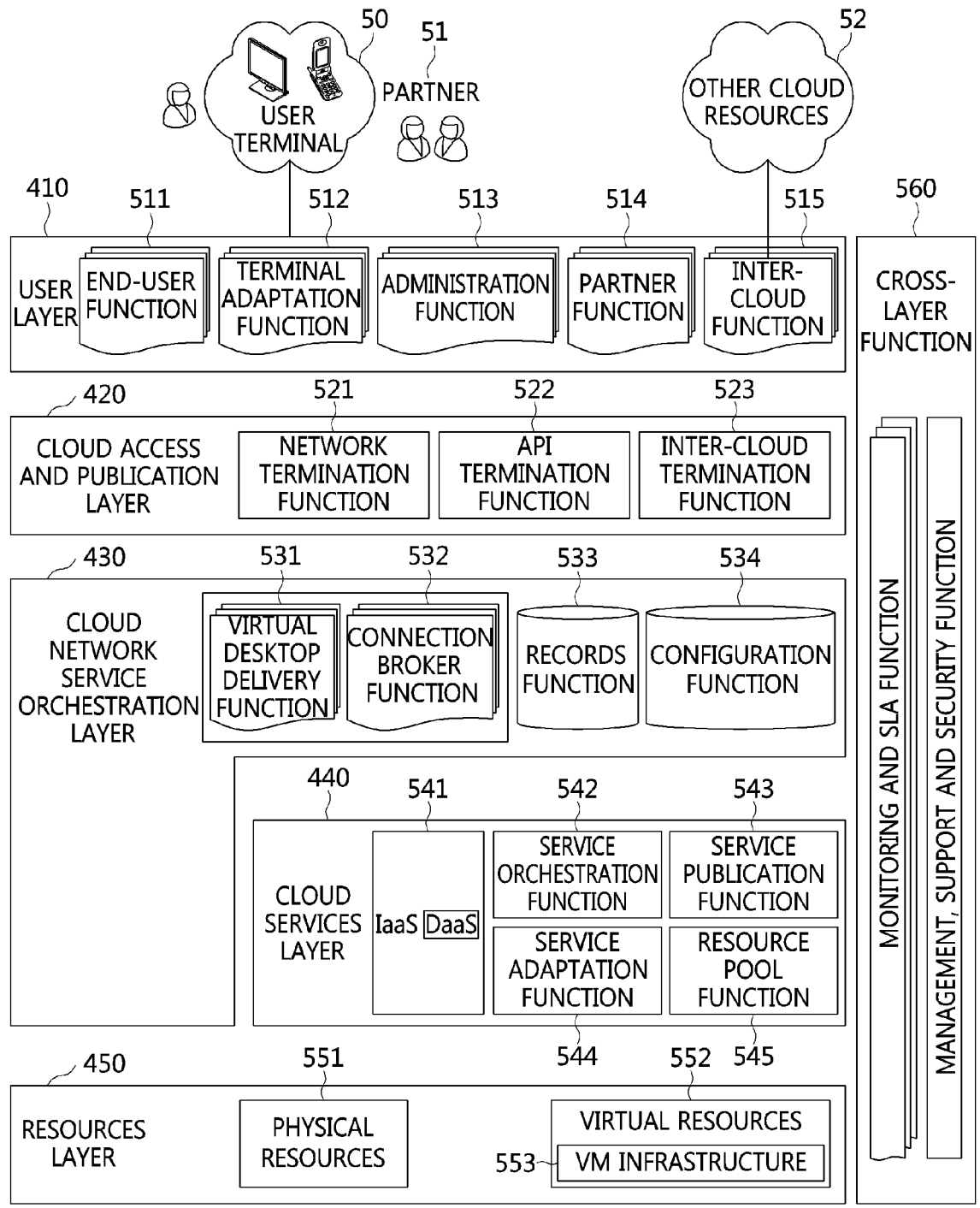
FIG. 5 is a conceptual diagram showing functional layered architecture for virtual desktop service according to an embodiment of the present invention.

Referring to FIG. 5, the user layer 410 is used to support interactions between the user terminal 50 and the cloud infrastructure, transmit a cloud service request, access the cloud service, and manage or monitor cloud resources, and includes an end-user function 511, a terminal adaptation function 512, an administration function 513, a partner function 514 for forming partnerships with partners 51, an inter-cloud function 515, etc.

When receiving the cloud service request, the cloud resource orchestrates its own resources or the resources of other cloud resources using the inter-cloud function 515 and provides the cloud service via the user layer 410. The end-user function 511 supports an end user, that is, the user terminal 50, so that the user terminal 50 accesses and consumes the cloud service. The administration function 513 supports a business administrator in managing cloud resources and services in a business process. The partner function 514 enables partnerships to be formed via a Cloud Service Provider (CSP).

The inter-cloud function 515 provides an interconnection interface and broker function so as to interconnect a relevant cloud resource with the cloud resources of a plurality of CSPs. Such an inter-cloud function 515 includes an inter-cloud service broker function, an inter-cloud portal function, etc. The inter-cloud broker function provides an alternative solution to cloud users or applications so as to access the cloud services and resources of other CSPs 52. The user terminal for the virtual desktop service may be any of various types of terminals such as a laptop computer, a desktop PC, a thin client, and a mobile phone. Further, terminal adaptation refers to the function of allowing a terminal device to provide a desktop having a suitable resolution, among various resolutions of different peripherals in different band environments.

Referring to FIG. 5, the cloud access and publication layer 420 provides a common interface to execute manual and automated cloud actions and consumption, grants cloud service consumption requests received from consumers or business processes using cloud Application Programming Interfaces (APIs), which are required to access the services and resources of the Cloud Service Providers (CSPs), and includes a network termination function, an API termination function, an inter-cloud mediation function, etc.

Referring to FIG. 5, the cloud network service orchestration layer 430 includes a virtual desktop delivery function 531 for encapsulating and delivering access to the entire information system environment or access to a remote client device via a network, and a connection broker function 532 including an authentication entity, a coordination entity, a monitoring and management entity, and a verification entity. The authentication entity allows the connection broker to provide approved access in a combination of personalized applications for different security levels by consulting a directory server so as to authenticate a user desktop session. The coordination entity allows the connection broker to perform a coordination function so that after the user desktop session has been authenticated, a common communication protocol for data and video transmission is used between the user terminal and the virtual desktop, in the case where various communication protocols may exist between the user terminal and the virtual desktop. The monitoring and management entity allows the connection broker to perform the actions of monitoring the runtime status of the virtual machine and guaranteeing the operating environment for the required applications. The verification entity allows the connection broker to provide a software license verification function so that the user terminal 50 can access a validated application hosted on the virtual desktop.

In the above-described virtual desktop delivery function 531, the Virtual Desktop Delivery Protocol (VDDP) is the core component of the virtual desktop delivery function 531, and provides a communication channel between the server for Desktop as a Service (DaaS) and the user terminal 50 so as to transfer all pieces of interaction information, for example, information about a display, input, a cursor, control and configuration, and monitoring information.

Further, in the above-described monitoring and management entity, the connection broker commands the virtual machine infrastructure to assign a new idle virtual machine instance in response to a newly received request, or to allocate a previous instance in response to a request presented by a client-side device after recovery from system failure. Also, the connection broker may request the virtual machine infrastructure to prepare a new cloud virtual machine for a newly logged-in user session (login user session). The above-described cloud network service orchestration layer 430 further includes a records function 533, a configuration function 534, etc.

Referring to FIG. 5, the cloud services layer 440 includes a DaaS function 541 and a resource pool function 545. The DaaS function provides the virtual desktop service to the user terminal 50 via a broadband network. The resource pool function 545 is a broadband resource repository or repository server set in which guest OSs and applications are serialized and stored, and includes a visualized modeling tool which generates a virtual template enabling the cloud virtual machine to be generated by the virtual machine infrastructure. The resource pool function 545 has the ability to dynamically assemble the resources required by the currently running virtual desktop, including OSs, application software, user profiles and system configuration, and to produce relevant image files. Further, the resource pool function 545 supports a network-based bootstrap protocol that enables communication with the virtual machine infrastructure and that enables virtual desktops to be remotely generated from the serialized image files. As shown in FIG. 5, the above-described cloud services layer 440 may further include a service orchestration function 542, a service publication function 543, and a service adaptation function 544.

Referring to FIG. 5, the resources layer 450 has physical resources 551, including computing resources, storage resources, network resources, power resources, and other essential facilities in the cloud computing environment, and virtual resources 552 including virtual machines, virtual network resources, and virtual storage resources. The virtual machines are virtual machines generated in a virtual machine infrastructure 553 using different server virtualization technologies, such as Xen and a Kernel-based Virtual Machine (KVM). Referring to FIG. 5, the functional layered architecture for the virtual desktop service according to the embodiment of the present invention may further provide a cross-layer function 560 including a monitoring and Service Level Agreement (SLA) function and a management, support and security function.

The above-described virtual machine infrastructure 553 denotes a cluster environment having High Availability (HA) characteristics, and is internally configured such that a large number of running virtual machine instances are generated from the same virtual machine template and are composed of identical parameters. Since almost all virtual machine infrastructures 553 provide virtual machine migration capability, they enable the currently running instance to be migrated to another hosting server in the event of system failure so as to maintain business continuity.

The virtual desktop service described in the present specification may be a service for providing a data storage hard disk or an application to the space of the Internet. In other words, this service may be a desktop service using a virtual machine generated by applying desktop virtualization technology, rather than using actual physical hardware for a PC or a desktop for business use. In this case, the generated virtual machine for the desktop is located at a remote place, such as in an Internet data center, and can be used in the same way as a local desktop, at any time and from anywhere. The virtual desktop service described in the present specification may be a DaaS service, a cloud computing service, or a cloud desktop service. The architecture for the virtual desktop service according to the embodiment of the present invention (the service architecture and the functional layered architecture) may be the design scheme of the system or server that provides the virtual desktop service to the user terminal, or may be the system or the server itself that provides the virtual desktop service to the user terminal.

Descriptions made above with reference to FIGS. 1 to 5 may be performed by the connection broker 110 of FIG. 2 or by a separate component via the modification of a designer. Details thereof will be described in detail with reference to the virtual desktop service in FIGS. 6 to 8.

Figure 6:
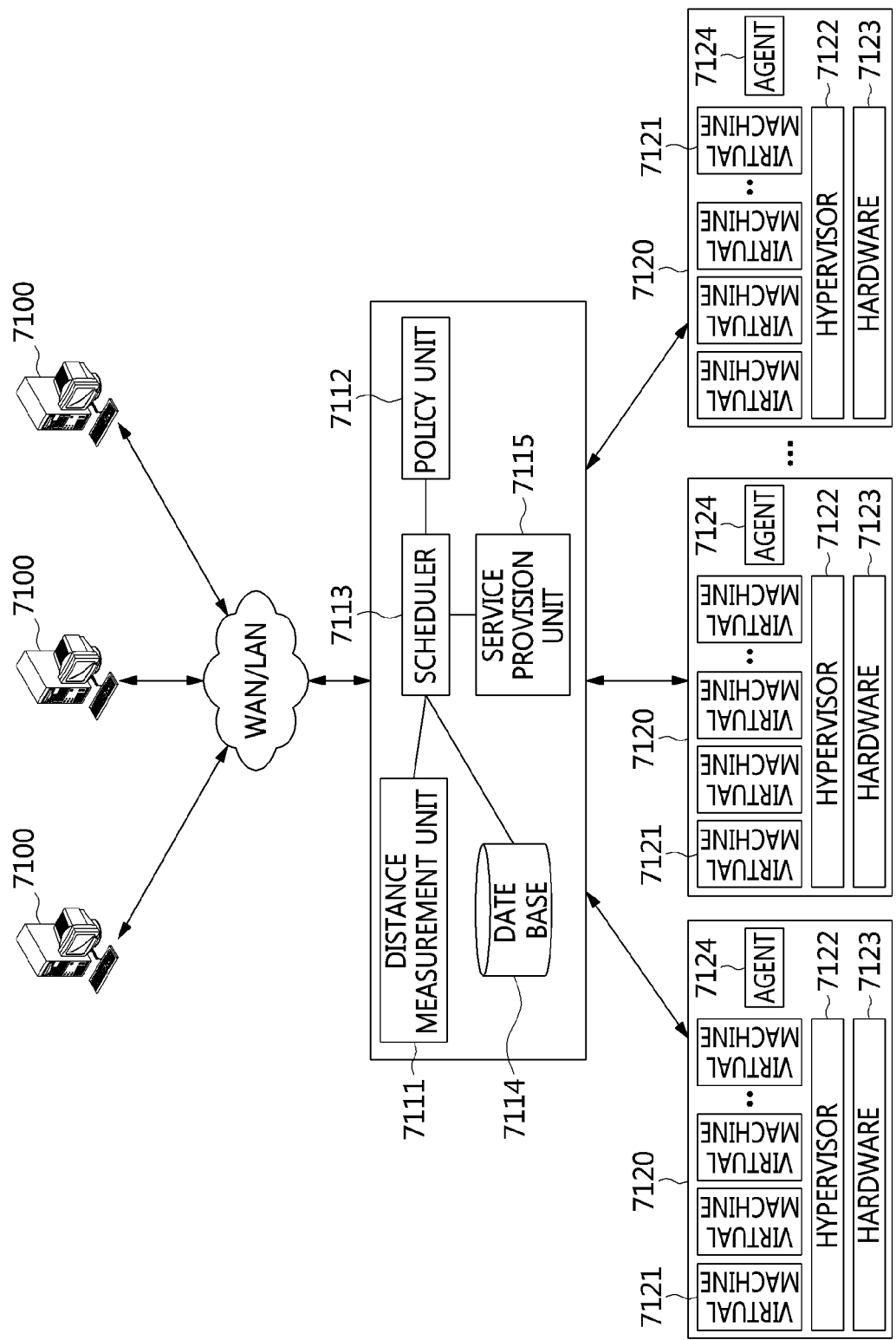
FIG. 6 is a diagram showing a network for providing virtual desktop service according to an embodiment of the present invention.

FIG. 6 is a diagram showing a network for providing virtual desktop service according to an embodiment of the present invention.

Referring to FIG. 6, the network for providing virtual desktop service includes a management server 7110 and a plurality of virtualization servers 7120 connected to the management server. The management server 7110 may provide virtual desktops implemented by the plurality of virtualization servers 120 to users over a Wide Area Network (WAN), a Local Area Network (LAN) or the like. The management server 7110 includes a distance measurement unit 7111, a policy unit 7112, a scheduler 7113, a database (DB) 7114, and a service provision unit 7115. The distance measurement unit 7111 measures the distances between each user and the plurality of virtualization servers 7120 connected to the management server 7110. The policy unit 7112 may provide a policy to the scheduler 7113 when at least one of the virtualization servers 7120 is selected in order for the management server 7110 to provide virtual desktop service to a corresponding user. Here, the policy may be provided to the scheduler 7113 with reference to information about the addresses of respective virtualization servers 7120 and the present status of assignment of the virtual machines 7121, which are stored in the DB 7114. The scheduler 7113 selects a virtualization server 7120 based on the policy, transmits an execution command for the virtual machines 7121 to the selected virtualization server 7120, and stores the results of execution in the DB 7114. The DB 7114 stores information about the addresses of the virtualization servers 7120, the present status of selection of the virtualization servers 7120, the present status of assignment of the virtual machines 7121 to respective virtualization servers 7120, etc. Further, the DB 7114 may also store information about the service usage patterns of respective users, the amounts of power used (power usage amounts) by the virtualization servers 7120, etc. The service provision unit 7115 may provide virtual desktop service to the corresponding user when the virtual machines 7121 are assigned to the virtualization server 7120 selected by the scheduler 7113. The virtualization server 7120 may run the virtual machines 7121 for providing the virtual desktop service to the user. That is, the hypervisor 7122 of the virtualization server 7120 may emulate the virtual machines 7121 using hardware 7123 included in the corresponding virtualization server 7120. Also, each virtualization server 7120 includes an agent 7124 for receiving a request from the scheduler 7113 of the management server 7110 and assigning virtual machines. Here, the agent 7124 may deliver information about the amount of various types of resources (e.g. a CPU, memory, a network, a disk, etc.) used by the virtualization server 7120, the present status of assignment of virtual machines 7121, the present status of power usage, etc. to the DB 7114 of the management server 7110.

Figure 7:
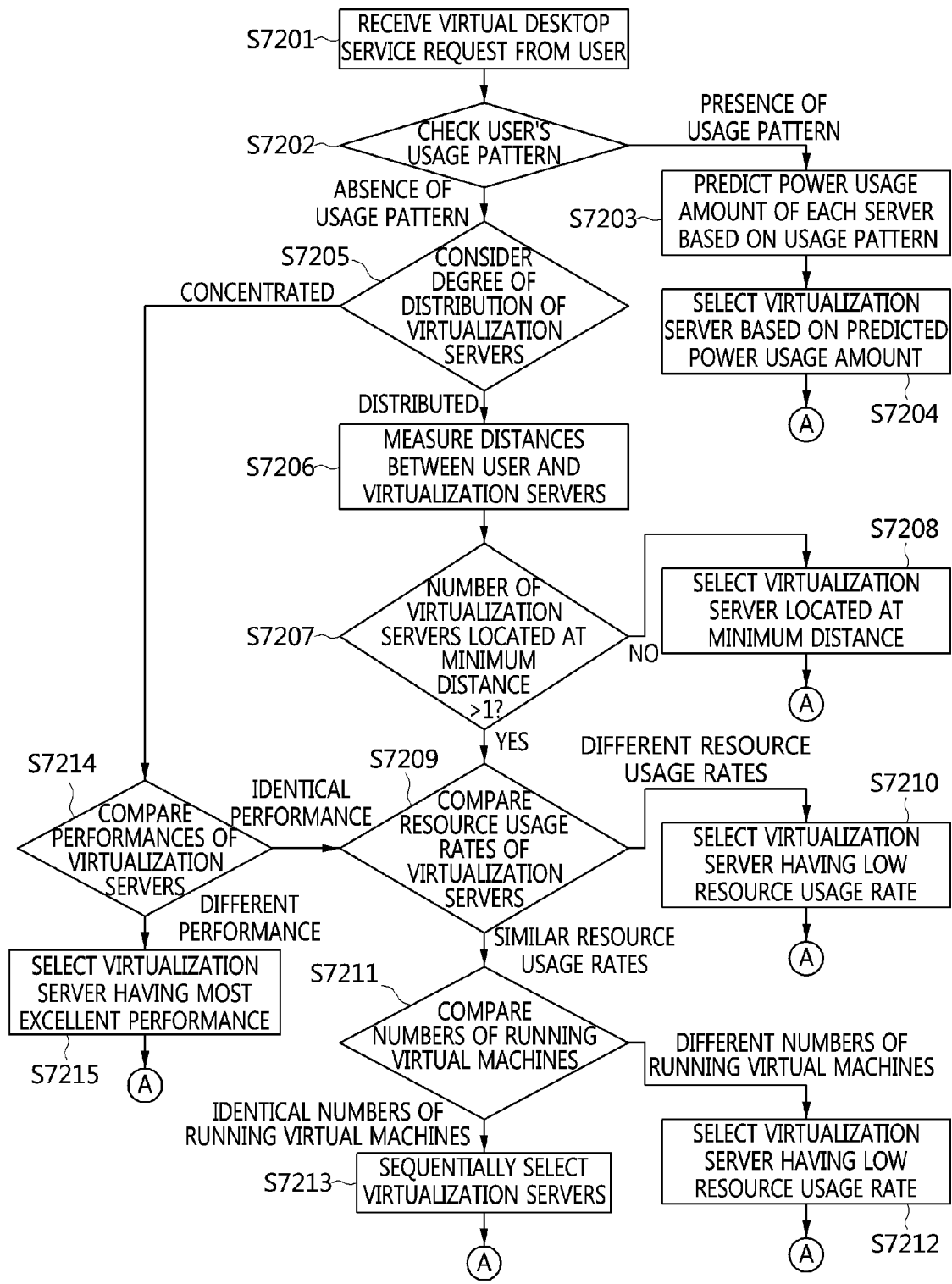
FIGS. 7 and 8 are flowcharts showing a procedure for providing virtual desktop service according to an embodiment of the present invention.
Figure 8:
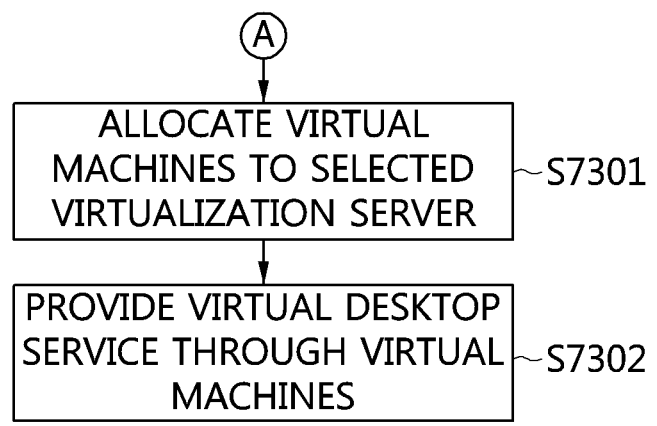

FIGS. 7 and 8 are flowcharts showing a procedure for providing virtual desktop service according to an embodiment of the present invention.

Referring to FIGS. 7 and 8, when a user requests virtual desktop service from the management server 7110 over a communication network at step S7201, the scheduler 7113 of the management server 7110 selects the virtualization server 7120 on which the virtual machines are to run. Here, the scheduler 7113 may select a plurality of virtualization servers 7120 falling within a similar range. In an embodiment of the present invention, when the current resource usage rate of a certain virtualization server is less than 50%, it is determined that virtualization servers, the resource usage rates of which fall within the range of ±5% of the current resource usage rate, are similar to each other. When the current resource usage rate of the certain virtualization server is equal to or greater than 50% and is less than 70%, it is determined that virtualization servers, the resource usage rates of which fall within the range of ±2% of the current resource usage rate, are similar to each other. When the current resource usage rate of the certain virtualization server is equal to or greater than 70%, it is determined that virtualization servers, the resource usage rates of which fall within the range of ±1% of the current resource usage rate, are similar to each other. First, the management server 7110 checks whether the usage pattern of the user has been input to the DB 7114 at step S7202, and predicts the amount of power to be used by each virtualization server based on the input usage pattern at step S7203. Thereafter, the management server 7110 may select a virtualization server 7120 based on the predicted server power usage amount at step S7204. Here, the usage pattern of the user denotes a pattern produced based on the average amount of resources used by the user during a predetermined period. The usage pattern of the user may be produced through a data mining technique. For example, a user who uses a virtual machine all day has a high probability of chiefly taking charge of a task related to a web search, wherein the amount of network usage is large, and not all of the performance of the allocated CPU and memory is utilized. This user is evaluated as having a network-type (NT) user usage pattern. That is, if the amounts of resources such as a CPU, memory, a network, and a disk used by the user are averaged to obtain an average value, and then the average value is substituted into a power usage prediction technique, the amount of server power to be used by the user may be predicted. User patterns may include a central processor unit (CPU)-type (CT), a network-type (NT), a memory-type (MT), a disk-type (DT), etc. However, when the usage pattern of the user is not input to the DB 7114, the management server 7110 considers the degree of distribution of virtualization servers 7120 at step S7205 and measures the distances between the user and the virtualization servers 7120 when the virtualization servers 7120 are distributed at step S7206. The distances between the user and the virtualization servers 712 are distances on the network. An algorithm such as Internet Distance Maps (IDMaps), M-Coop, King, or virtual landmarks may be used for distance measurement. Further, the management server 7110 counts the number of virtualization servers 7120 located at a minimum distance from the user (closest to the user) on the network (which have a shorter network delay) at step S7207. If there is one virtualization server 7120 located at a minimum distance from the user, that virtualization server 7120 is selected at step S7208. Here, when there are m virtualization servers 7120 located at the same distance from the user on the network, the management server 7110 compares the specifications of virtual machines running on the m virtualization servers 7120 at step S7209, and selects a virtualization server 7120 having a low resource usage rate at step S7210. That is, when the m virtualization servers 7120 are connected to the management server 7110, the management server 7110 may assign weights to the specifications of CPUs, memories, disks, etc. used in respective virtualization servers 7120, quantify resultant specification values, compare the quantified values of respective virtualization servers 7120, and then select the virtualization server having the lowest resource usage rate. However, if the resource usage rates of the m virtualization servers 7120 are similar to each other, the management server 7110 compares the numbers of virtual machines running on the respective virtualization servers 7120 at step S7211, and selects the virtualization server 7120 having the smallest number of running virtual machines at step S7212. That is, when the m virtualization servers 7120 are connected to the management server 7110, the management server 7110 may compare the numbers of virtual machines assigned to respective virtualization servers 7120 and may then select the virtualization server 7120 on which the smallest number of virtual machines are running. Further, if the virtualization servers 7120 have no difference in performance, the resource usage rates of respective virtualization servers 7120 fall within a similar range, and the numbers of virtual machines running on respective virtualization servers 7120 are identical to each other, the respective virtualization servers 7120 are sequentially selected at step S7213. That is, when the m virtualization servers 7120 are connected to the management server 7110, the management server 7110 may sequentially select the respective virtualization servers 7120 and may assign virtual machines to the virtualization servers. Meanwhile, if the virtualization servers 7120 are locally concentrated, the management server 7110 compares the performances of the plurality of virtualization servers 7120 without measuring the distances between the user and the virtualization servers 7120 at step S7214, and selects the virtualization server 7120 having the best performance at step S7215. In an embodiment of the present invention, the server having the lowest power consumption may be determined to be the best virtualization server 7120. That is, in accordance with an embodiment of the present invention, in the situation in which the virtualization servers 7120 are locally concentrated, the server having the smallest amount of power usage may be primarily selected. However, when there is no difference in performance between the virtualization servers 7120, the management server 7110 compares the specifications of a plurality of virtual machines (i.e. specifications of CPUs, memories, and disks) running on respective virtualization servers 7120 at step S7209, and selects a virtualization server 7120 having a low resource usage rate at step S7210. However, if there is no difference in performance between the virtualization servers 7120 and the resource usage rates of the virtualization servers 7120 are similar to each other, the management server 7110 selects the virtualization server 7120 on which the smallest number of virtual machines is running from among the virtualization servers 7120 at step S7212. Further, if there is no difference in performance between the virtualization servers 7120, the resource usage rates of respective virtualization servers 7120 are similar to each other, and the numbers of virtual machines running on respective virtualization servers 7120 are identical to each other, the virtualization servers 7120 are sequentially selected at step S7213. At this time, the management server 7110 may assign virtual machines that perform similar tasks to a single virtualization server 7120 depending on the user's task type. The reason for this is that, when virtual machines that perform similar tasks run on a single virtualization server 7120, the improvement of performance using caching may be predicted when virtual desktop service is provided. In this case, when a specific user requests the provision of virtual desktop service for a given task, the management server 7110 may select a virtualization server 7120 that is designated according to the type of task for the specific user. Therefore, users who perform a similar task may be grouped to use virtual machines assigned to the same virtualization server 7120 and may share CPU, memory, and cache resources with each other.

Referring to FIG. 8, the scheduler 7113 of the management server 7110 may select the corresponding virtualization server 7120, and the agent 7124 of the virtualization server 7120 may receive a request from the scheduler 7113 and assign virtual machines to the virtualization server 7120 at step S7301. Thereafter, the service provision unit 7115 of the management server 7110 may provide virtual desktop service to the user through virtual machines running on the selected virtualization server 7120 at step S7302.

Descriptions made above with reference to FIGS. 6 to 8 may be performed by the connection broker 110 of FIG. 2 or by a separate component via the modification of a designer. Details thereof will be described in detail with reference to the virtual desktop service in FIGS. 9 to 13.

Figure 9:
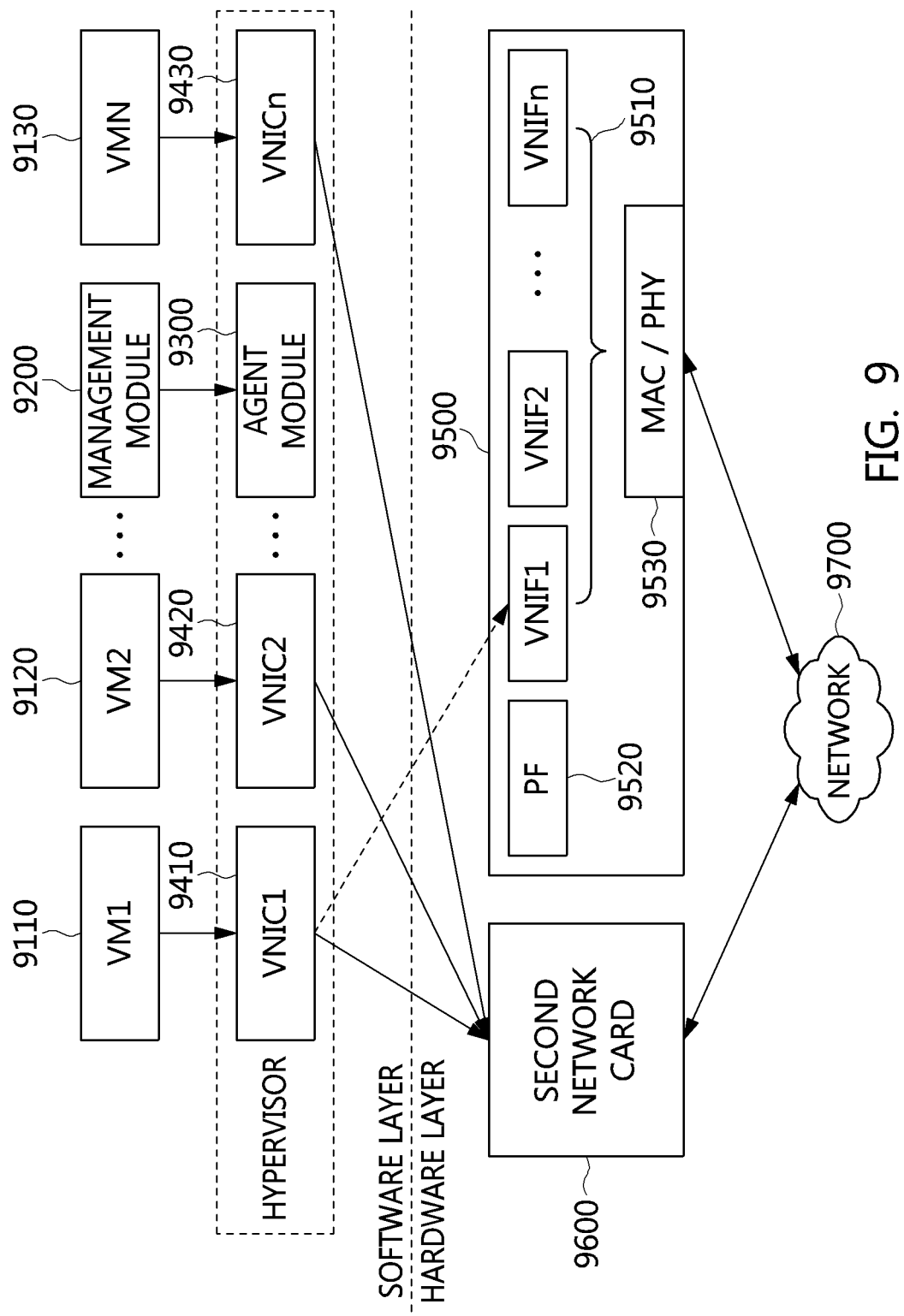
FIG. 9 is a block diagram showing a system for virtual desktop service according to an embodiment of the present invention.

FIG. 9 is a block diagram showing a system for virtual desktop service according to an embodiment of the present invention.

Referring to FIG. 9, the system for virtual desktop service according to the embodiment of the present invention may include one or more virtual machines 9110, 9120, and 9130, a management module 9200, an agent module 9300, one or more virtual network interface cards 9410, 9420, and 9430, a first network card 9500, and a second network card 9600. The virtual desktop service system according to the embodiment of the present invention may include a software layer and a hardware layer. For example, the software layer may run on the Operating System (OS) of the virtual desktop service system. The software layer may include the one or more virtual machines 9110, 9120, and 9130, the management module 9200, the agent module 9300, and the one or more virtual network interface cards 9410, 9420, and 9430. The hardware layer may support the network connection of the software layer. The hardware layer may include the first network card 9500 and the second network card 9600. For example, the first network card 9500 may be a network card to which virtualization-supporting architecture using hardware is applied. The virtualization-supporting architecture using hardware may include, for example, Single Root I/O Virtualization (SR-IOV) architecture. The second network card 9600 may be a typical network card. The one or more virtual machines 9110, 9120, and 9130 may be generated by a hypervisor. However, the present invention is not limited thereto, and the hypervisor shown in FIG. 9 may be replaced with a virtual machine monitor (VMM). The one or more virtual machines 9110, 9120, and 9130 may be connected to the first network card 9500 or the second network card 9600 through the one or more virtual network interface cards 9410, 9420, and 9430, respectively. Further, each of the one or more virtual machines 9110, 9120, and 9130 may be connected to a network 9700 either through the virtual network interfaces 9510 of the first network card 9500 allocated by the management module 9200 or through the second network card 9600. For example, the virtual network interfaces 9510 may run based on hardware. The one or more respective virtual machines 9110, 9120, and 9130 may also be called virtual desktops. The management module 9200 may provide respective network connections to the one or more virtual machines 9110, 9120, and 9130. The management module 9200 may assign the one or more virtual machines 9110, 9120, and 9130 to the virtual network interfaces 9510 of the first network card 9500 or to the second network card 9600 through the one or more virtual network interface cards 9410, 9420, and 9430, respectively. For example, the management module 9200 may provide respective network connections to the one or more virtual machines 9110, 9120, and 9130 based on network connection information delivered from the agent module 9300. For example, the network connection information may mean information indicating the path through which each of the virtual machines 9110, 9120, and 9130 is connected to the network. Hereinafter, for the convenience of description, a description will be made on the assumption that the first virtual machine (VM1) 9110 to the n-th virtual machine (VMn) 9130 are connected to the second network card 9600 through respective virtual network interface cards 9410, 9420, and 9430 and are connected to the network 9700 through the second network card 9600. The management module 9200 may monitor the amount of network usage by each of the virtual machines 9110, 9120 and 9130. For example, the management module 9200 may periodically monitor the amount of network usage by each of the virtual machines 9110, 9120, and 9130 at predetermined time intervals. The management module 9200 may reestablish the network connections of the virtual machines 9110, 9120, and 9130 based on the results of the monitoring. For example, the management module 9200 may change the connection of the network to a virtual machine (e.g. the first virtual machine 9110), the network usage amount of which is greater than a reference value, among the one or more virtual machines 9110, 9120, and 9130, to the virtual network interface (VNIF1) 9510 of the first network card 9500 based on the results of the monitoring. The management module 9200 may be implemented using, for example, one of the one or more virtual machines 9110, 9120, and 9130. Further, the management module 9200 may be implemented on another computer and may then be connected to the network through a suitable interface, or, alternatively, may be implemented in the hypervisor. The agent module 9300 may provide information about the network connections of the one or more virtual machines 9110, 9120, and 9130 to the management module 9200. The agent module 9300 may run on the hypervisor or a virtual machine monitor (VMM). The first network card 9500 may be the network card to which virtualization-supporting architecture using hardware is applied. The virtualization-supporting architecture using hardware may include, for example, Single Root I/O Virtualization (SR-IOV) architecture. The first network card 9500 may include the one or more virtual network interfaces 9510, a Physical Function (PF) 9520, and a media access control/physical layer (MAC/PHY) 9530. The one or more virtual network interfaces 9510 may provide a connection to the network 9700 and may be operated based on the PF 9520. The MAC/PHY 9530 may be defined as a MAC layer and a physical layer. As described above, the virtual desktop service system according to the embodiment of the present invention may monitor the amount of network usage by each of the one or more virtual machines 9110, 9120, and 9130, and may reallocate the one or more virtual network interfaces 9510 to the one or more virtual machines based on the results of the monitoring. Therefore, when the network usage amount of a virtual machine (e.g. the first virtual machine) connected to the network through the second network card 9600 is greater than a reference value, the virtual desktop service system according to the embodiment of the present invention may allocate the virtual network interface (VNIF1) 9510 of the first network card 9500 to the virtual machine (e.g. the first virtual machine), thus improving network I/O performance. Consequently, the virtual desktop service system according to the embodiment of the present invention may dynamically allocate network resources in a server virtualization environment which uses the network card 9500 to which the virtualization-supporting architecture using hardware is applied, thus improving network I/O performance.

Figure 10:
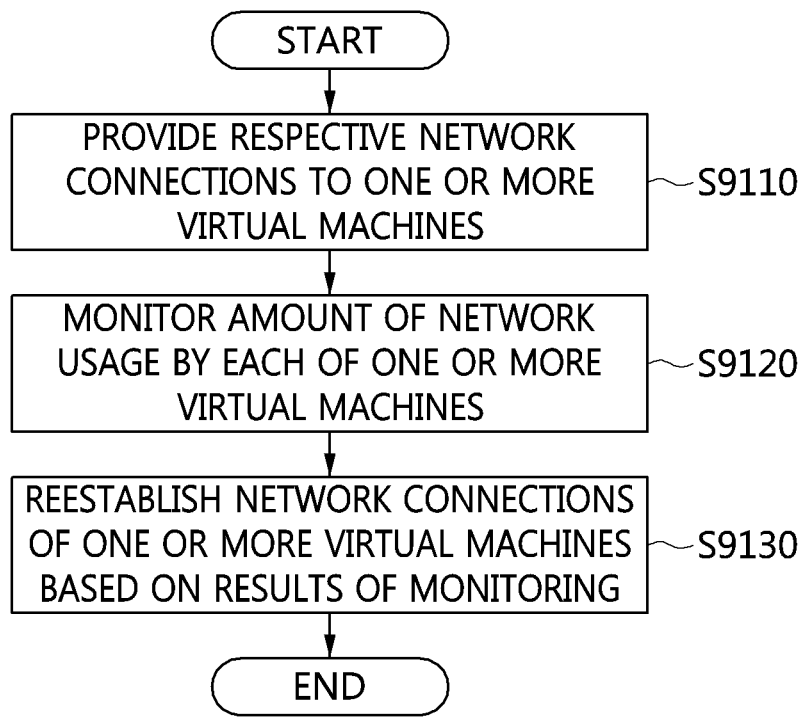
FIG. 10 is a flowchart showing a method for providing virtual desktop service according to an embodiment of the present invention.

FIG. 10 is a flowchart showing a method for providing virtual desktop service according to an embodiment of the present invention.

Referring to FIG. 10, the virtual desktop service provision method according to the embodiment of the present invention may include the step S9110 of providing respective network connections to one or more virtual machines, the step S9120 of monitoring the amount of network usage by each of the virtual machines, and the step S9130 of reestablishing the network connections of the one or more virtual machines based on the results of the monitoring.

Below, the above-described steps S91110 to S9130 are described in detail with reference to FIGS. 9 and 10.

At step S9110, the management module 9200 may provide respective network connections to the one or more virtual machines 9110, 9120, and 9130 through the first network card 9500 and/or the second network card 9600. For example, the management module 9200 is assumed to provide respective network connections to the one or more virtual machines through the second network card 9600. The first network card 9500 may be a network card to which virtualization-supporting architecture using hardware is applied. For example, the management module 9200 may provide the network connection to each of the one or more virtual machines based on network connection information delivered from the agent module 9300.

At step S9120, the management module 9200 may monitor the amount of network usage by each of the one or more virtual machines. For example, the management module 9200 may periodically monitor the amount of network usage at predetermined time intervals.

At step S9130, the management module 9200 may reestablish the network connection of, for example, a corresponding one, of the one or more virtual machines based on the results of the monitoring. The management module 9200 may reestablish the network connection of the corresponding one of the one or more virtual machines based on various references. For example, the management module 9200 may reestablish the network connection by comparing the amount of network usage by each of the one or more virtual machines with a reference value. For example, when the amount of network usage by a virtual machine (e.g. the first virtual machine) connected to the network through the second network card 9600 is greater than the reference value, the management module 9200 may improve the network I/O performance by allocating the virtual network interface (VNIF1) 9510 of the first network card 9500 to the virtual machine (e.g. the first virtual machine).

Figure 11:
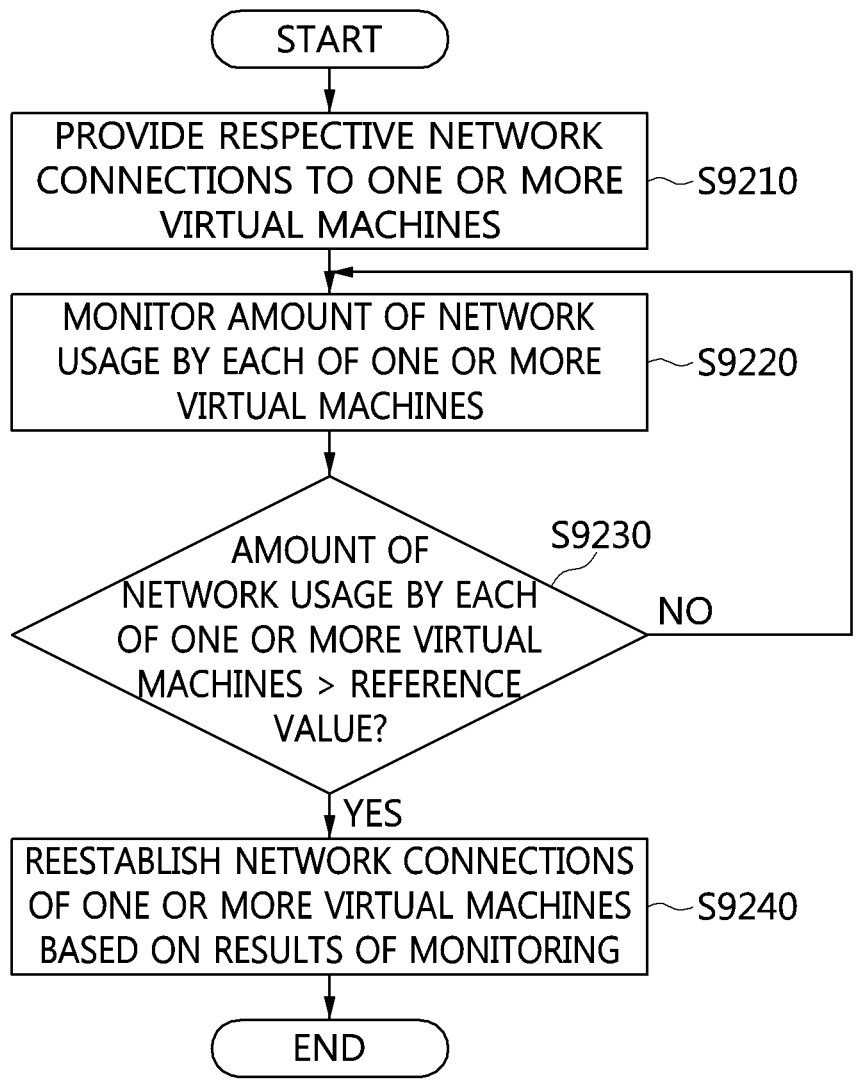
FIG. 11 is a flowchart showing a method for providing virtual desktop service according to another embodiment of the present invention.

FIG. 11 is a flowchart showing a method for providing virtual desktop service according to another embodiment of the present invention.

In FIG. 11, a description will be chiefly made based on the difference from the virtual desktop service provision method, shown in FIG. 10, in order to avoid the unnecessary repetition of descriptions.

Referring to FIG. 11, the virtual desktop service provision method according to another embodiment of the present invention may include the step S9210 of providing respective network connections to one or more virtual machines, the step S9220 of monitoring the amount of network usage by each of the one or more virtual machines, the step S9230 of determining whether the amount of network usage by each of the one or more virtual machines is greater than a reference value, and the step S9240 of reestablishing the network connections of the one or more virtual machines.

Steps S9210 and S9220 may be substantially identical to steps S9110 and S9120, which are described above with reference to FIG. 10, and thus a description will be made based on steps S9230 and S9240.

At step S9230, the management module 9200 may determine whether the amount of network usage by each of the one or more virtual machines is found to be greater than the reference value, based on the results of the monitoring. As a result of the determination, if the amount of network usage by each of the one or more virtual machines is greater than the reference value, step S9240 may be performed. As a result of the determination, if the amount of network usage by each of the virtual machines is found not to be greater than the reference value, step 9220 may be performed.

At step S9240, the management module 9200 may reestablish the network connections of the one or more virtual machines. More specifically, the management module 9200 may reestablish a network connection so that, when the amount of network usage by a certain virtual machine (e.g. the first virtual machine 9110), among the one or more virtual machines, is greater than the reference value, the first virtual machine 9110 is connected to the network 9700 through the virtual network interface (VNIF1) 9510 of the first network card 9500.

Further, the management module 9200 is not limited to this operation, but may also reallocate the virtual network interfaces (VNIF2 and VNIF3) 9510 to the one or more virtual machines 9120 and 9130 if the amount of network usage by each of the virtual machines 9120 and 9130 is greater than the reference value.

Figure 12:
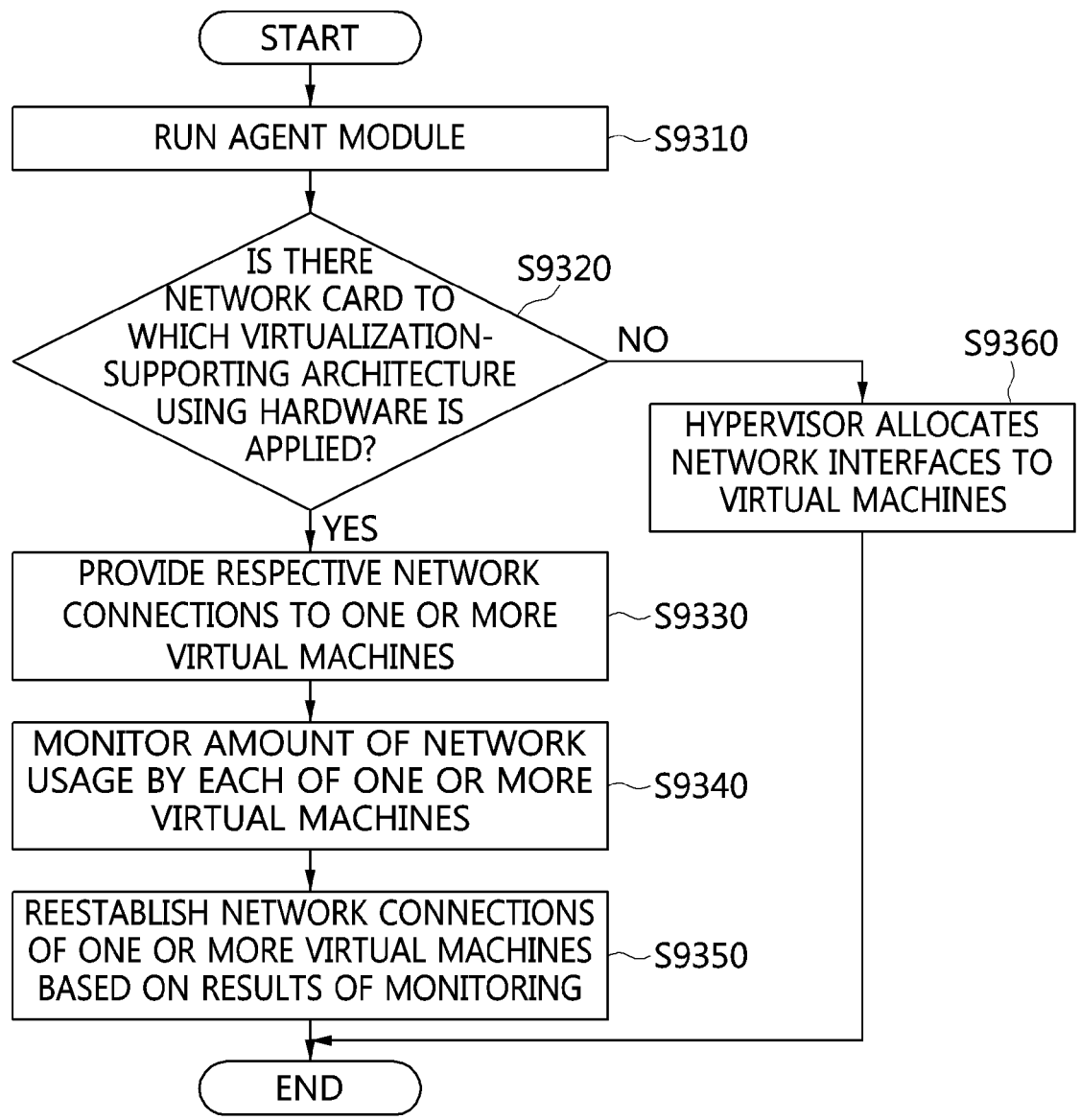
FIG. 12 is a flowchart showing a method for providing virtual desktop service according to a further embodiment of the present invention.

FIG. 12 is a flowchart showing a method for providing virtual desktop service according to a further embodiment of the present invention.

In FIG. 12, a description will be chiefly made based on the difference from the virtual desktop service provision method, shown in FIG. 10, in order to avoid the unnecessary repetition of descriptions.

Referring to FIG. 12, the virtual desktop service provision method according to the further embodiment of the present invention may include the step S9310 of running the agent module, the step S9320 of determining whether there is a network card to which virtualization-supporting architecture using hardware is applied, the step S9330 of providing respective network connections to the one or more virtual machines, the step S9340 of monitoring the amount of network usage by each of the one or more virtual machines, the step S9350 of reestablishing the network connections of the one or more virtual machines based on the results of the monitoring, and the step S9360 of allocating, by the hypervisor, network interfaces to the one or more virtual machines.

Steps S9330 to S9350 may be substantially identical to steps S9110 to S9130, described above with reference to FIG. 10, and thus a description will be made based on steps S9310, S9320, and S9360.

At step S9310, the agent module 9300 may run. For example, the agent module 9300 may run on the hypervisor or the virtual machine monitor (VMM). At step S9320, the agent module 9300 may detect whether there is a network card to which the virtualization-supporting architecture using hardware is applied. For example, the agent module 9300 may detect whether the first network card 9500 has been installed in the virtual desktop service system.

At step S9360, the hypervisor or the VMM may allocate network interfaces to the one or more virtual machines 9110, 9120, and 9130 (see FIG. 9). That is, step S9360 may be understood to be the procedure for allocating network interfaces using typical software. Step S9360 may be performed when the first network card 9500 and the second network card 9600 are not installed in the virtual desktop service system.

Figure 13:
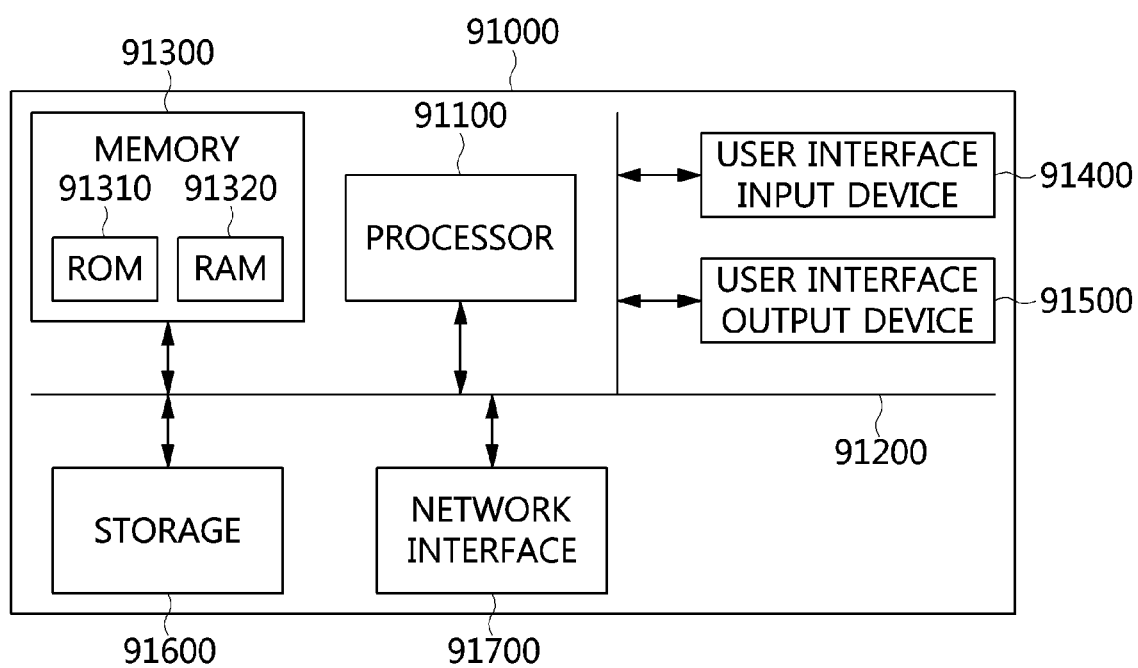
FIG. 13 is a block diagram showing a computing system for performing the virtual desktop service provision method according to an embodiment of the present invention.

FIG. 13 is a block diagram showing a computing system for performing the virtual desktop service provision method according to an embodiment of the present invention.

Referring to FIG. 13, a computing system 91000 may include at least one processor 91100, a memory 91300, a user interface input device 91400, a user interface output device 91500, storage 91600, and a network interface 91700, which are connected to each other through a bus 91200.

The processor 91100 may be a Central Processing Unit (CPU) or a semiconductor device for processing instructions stored in the memory 91300 and/or the storage 91600. Each of the memory 91300 and the storage 91600 may include any of various types of volatile or nonvolatile storage media. For example, the memory 91300 may include a Read Only Memory (ROM) and a Random Access Memory (RAM).

Therefore, the steps of the method or algorithm, which have been described in relation to the embodiments disclosed in the present specification, may be directly implemented as a hardware module or a software module, which is executed by the processor 91100, or as a combination of the two types of modules. The software module may reside in a storage medium (i.e. the memory 91300 and/or the storage 91600), such as a RAM, a flash memory, a ROM, an erasable programmable ROM (EPROM), an electrically erasable programmable ROM (EEPROM), a register, a hard disk, a removable disk, or a Compact Disk (CD)-ROM. An exemplary storage medium may be coupled to the processor 91100, which may read information from the storage media and write information to the storage media. Alternatively, the storage medium may be integrated with the processor 91100. The processor and the storage medium may also reside in an application-specific integrated circuit (ASIC). The ASIC may reside in a user terminal. Alternatively, the processor and the storage medium may reside, as individual components, in the user terminal.

Descriptions made above with reference to FIGS. 9 to 13 may be performed by the connection broker 110 of FIG. 2 or by a separate component via the modification of a designer. Details thereof will be described in detail with reference to the virtual desktop service in FIGS. 14 to 17.

Figure 14:
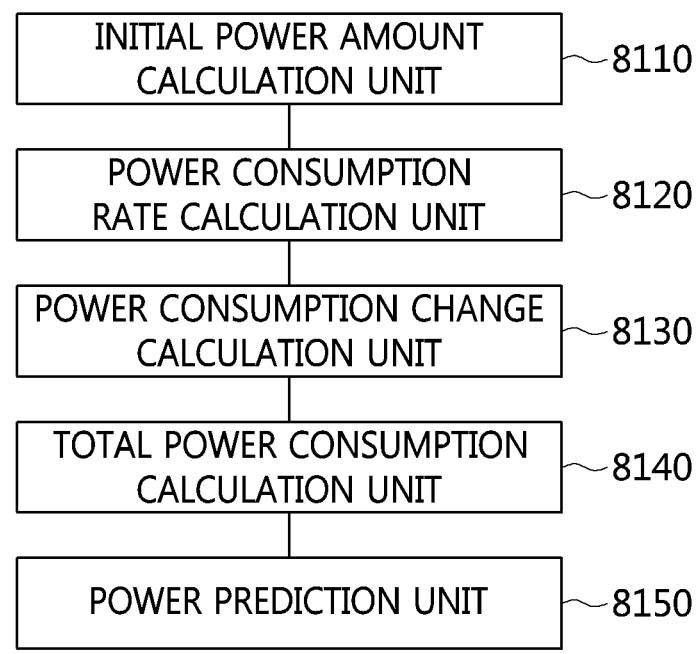
FIG. 14 is a diagram for explaining the configuration of a server power prediction apparatus using a virtual machine according to the present invention.
Figure 15:
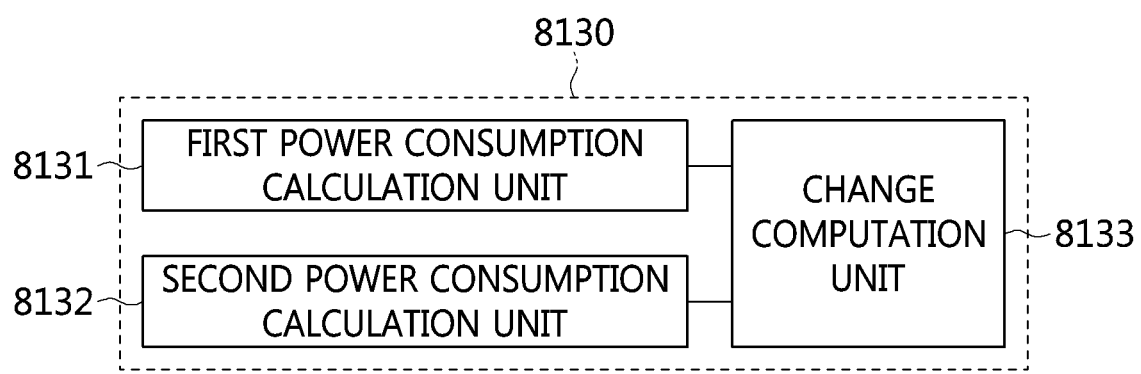
FIG. 15 is a diagram for explaining the detailed configuration of a power consumption change calculation unit employed in the server power prediction apparatus using a virtual machine according to the present invention.

FIG. 14 is a diagram for explaining the configuration of a server power prediction apparatus using a virtual machine according to the present invention, and FIG. 15 is a diagram for explaining the detailed configuration of a power consumption change calculation unit employed in the server power prediction apparatus using a virtual machine according to the present invention.

Referring to FIG. 14, a server power prediction apparatus 8100 using a virtual machine according to the present invention chiefly includes an initial power amount calculation unit 8110, a power consumption rate calculation unit 8120, a power consumption change calculation unit 8130, a total power consumption calculation unit 8140, and a power prediction unit 8150.

First, the virtual machine according to the present invention is a server allocated to calculate the amount of virtual power, wherein the type of CPU, the type or capacity of a memory, and the configuration of a hard disk are set in the virtual machine. Further, in the present invention, the virtual machine may be assigned as a plurality of virtual machines to the server as needed.

The initial power amount calculation unit 8110 calculates the amount of initial power of the virtual machine assigned to the server. The initial power amount calculation unit 8110 calculates the amount of initial power as the sum of the amount of power when the virtual machine is in a standby state, the amount of power when the virtual machine is in a sleep state, and the amount of power when the virtual machine is in an idle state.

That is, the initial power amount calculation unit 8110 calculates the amount of initial power using the following Equation (1):

$$P\text{start},vm(S) = P\text{standby},vm + P\text{sleep},vm + P\text{idle},vm \qquad (1)$$

where Pstart(S) denotes the amount of initial power, Pstandby denotes the amount of power when the virtual machine is in a standby state, Psleep denotes the amount of power when the virtual machine is in a sleep state, and Pidle denotes the amount of power when the virtual machine is in an idle state.

The power consumption rate calculation unit 8120 individually calculates the power consumption rates for respective components of the virtual machine. That is, the power consumption rate calculation unit 8120 calculates power consumption rates for respective components, which indicate the ratios of power consumptions for respective components of the virtual machine to the total power consumption of the virtual machine at a specific time. In this case, the components of the virtual machine include at least one of a CPU, a memory, and a hard disk, similar to the components of the server. Here, when the power consumption of components occupied per virtual machine is measured, about 70% or more of the total power consumption is concentrated in the CPU, the memory and the hard disk. In detail, the CPU accounts for the greatest part of power consumption, and the memory and the hard disk sequentially account for the next greatest parts of power consumption.

That is, the power consumption rate calculation unit 8120 calculates the power consumption rates using the following Equation (2). That is, as shown in Equation (2), when a power consumption rate α is fixed, and the total power consumption of the virtual machine is measured, the power consumption rates for respective components at a specific time are calculated. This calculation is identical to the finding of a solution of three simultaneous linear equations.

$$\begin{bmatrix} Ucpu1 & Umem1 & Uhdd1 \\ Ucpu2 & Umem2 & Uhdd2 \\ Ucpu3 & Umem3 & Uhdd3 \end{bmatrix} \begin{bmatrix} \alpha cpu \\ \alpha mem \\ \alpha hdd \end{bmatrix} = \begin{bmatrix} Pvm1 \\ Pvm2 \\ Pvm3 \end{bmatrix} \qquad (2)$$

where Ucpu1, Umem1, and Uhdd1 denote respective power consumption changes in the CPU, the memory, and the hard disk of a first virtual machine, Ucpu2, Umem2, and Uhdd2 denote respective power consumption changes in the CPU, the memory, and the hard disk of a second virtual machine, and Ucpu3, Umem3, and Uhdd3 denote respective power consumption changes in the CPU, the memory, and the hard disk of a third virtual machine. Further, αcpu, αmem, and αhdd denote the power consumption rates of the CPU, the memory and the hard disk, respectively, Pvm1 denotes the total power consumption of the first virtual machine, Pvm2 denotes the total power consumption of the second virtual machine, and Pvm3 denotes the total power consumption of the third virtual machine.

The power consumption change calculation unit 8130 calculates the power consumption changes for respective components of the corresponding virtual machine during a predetermined period of time. For this, as shown in FIG. 15, the power consumption change calculation unit 8130 includes a first power consumption calculation unit 8131, a second power consumption calculation unit 8132, and a change computation unit 8133. The first power consumption calculation unit 8131 calculates the first current power consumptions for respective components of the virtual machine at a specific time. The second power consumption calculation unit 8132 calculates second current power consumptions for respective components of the virtual machine after a predetermined period of time has elapsed from the specific time. The change computation unit 8133 computes the power consumption changes corresponding to the differences between the second current power consumptions and the first current power consumptions for respective components of the virtual machine. The total power consumption calculation unit 8140 calculates the total power consumption of the virtual machine based on the initial power amount of the virtual machine, the power consumption rates for respective components, and the power consumption changes for respective components. That is, the total power consumption calculation unit 8140 calculates the total power consumption of the virtual machine by multiplying the power consumption rates, calculated for respective components, by the respective power consumption changes, summing the resultant values, and then adding the initial power amount of the virtual machine, calculated above using Equation (1), to the summed value.

That is, the total power consumption calculation unit 8140 calculates the total power consumption using the following Equation (3):

$$Pvm(t,S)=Pstart,vm(S)+\alpha cpu \cdot Ucpu(t)+\alpha mem \cdot Umem(t)+\alpha hdd \cdot Uhdd(t) \quad (3)$$

where Pvm denotes the total power consumption of the virtual machine, Pstart,vm(S) denotes the initial power amount of the virtual machine, $\alpha cpu \cdot Ucpu(t)$ denotes the product (multiplication) of the power consumption rate of the CPU, among the components of the virtual machine, and the power consumption change in the CPU at time t, $\alpha mem \cdot Umem(t)$ denotes the product of the power consumption rate of the memory, among the components of the virtual machine, and the power consumption change in the memory at time t, and $\alpha hdd \cdot Uhdd(t)$ denotes the product of the power consumption rate of the hard disk, among the components of the virtual machine, and the power consumption change in the hard disk at time t.

The power prediction unit 8150 predicts the total power consumption of the server by adding the total power consumption of the virtual machine to the initial power amount of the server. That is, the power prediction unit 8150 calculates the total power consumption using the following Equation (4):

$$Pserver(t,S)=Pstart,server(S)+Pvm1(t)+Pvm2(t)+\ldots+Pvmn(t) \quad (4)$$

where Pserver denotes the total power consumption of the server, Pstart,server(S) denotes the initial power amount of the server, Pvm1 denotes the total power consumption of the first virtual machine at time t, Pvm2 denotes the total power consumption of the second virtual machine at time t, Pvm3 denotes the total power consumption of the third virtual machine at time t, and Pvmn denotes the total power consumption of the n-th virtual machine at time t.

Meanwhile, the power prediction unit 8150 calculates the amount of initial power of the server as the sum of the amount of power when the server is in a standby state, the amount of power when the server is in a sleep state, and the amount of power when the server is in an idle state.

That is, the power prediction unit 8150 calculates the amount of initial power of the server using the following Equation (5):

$$Pstart,serve(S)=Pstandby,server+Psleep,server+Pidle,server \quad (5)$$

where Pstart,server(S) denotes the amount of initial power, Pstandby,server denotes the amount of power when the server is in a standby state, Psleep,server denotes the amount of power when the server is in a sleep state, and Pidle,server denotes the amount of power when the server is in an idle state.

Figure 16:
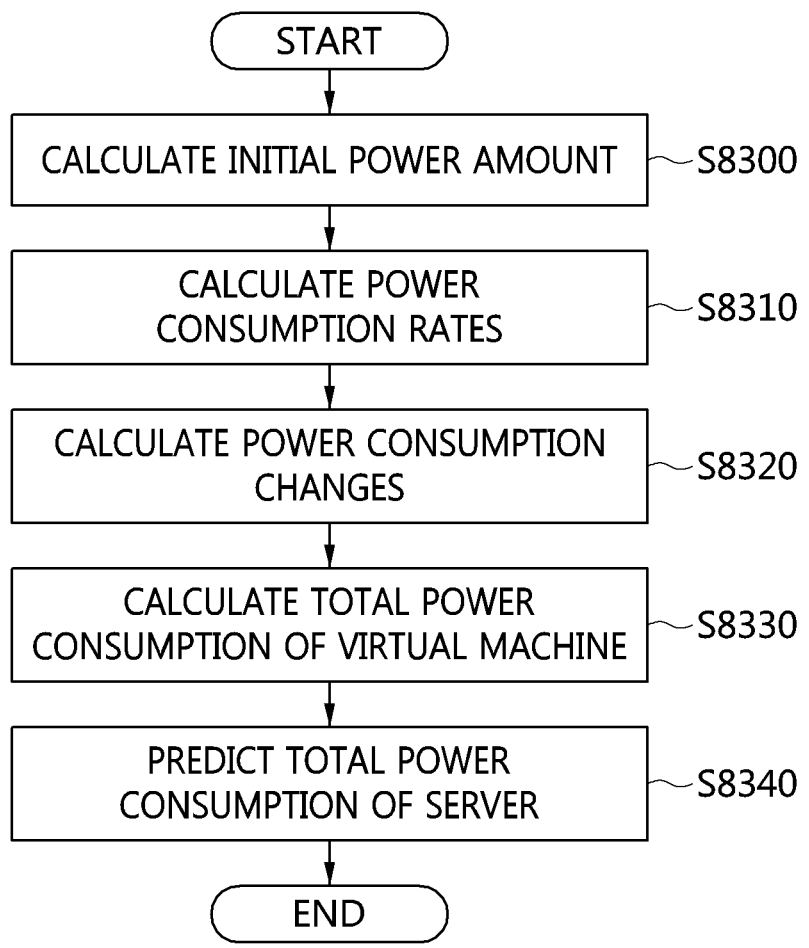
FIG. 16 is a diagram for explaining the sequence of a server power prediction method using a virtual machine according to the present invention.

FIG. 16 is a diagram for explaining the sequence of a server power prediction method using a virtual machine according to the present invention.

Referring to FIG. 16, the server power prediction method using a virtual machine according to the present invention uses the above-described server power prediction apparatus using a virtual machine, and thus a repeated description thereof will be omitted.

First, the amount of initial power of each virtual machine assigned to the server is calculated at step S8300. At step S8300, the amount of initial power is calculated as the sum of the amount of power when the virtual machine is in a standby state, the amount of power when the virtual machine is in a sleep state, and the amount of power when the virtual machine is in an idle state.

Next, the power consumption rates for respective components of the virtual machine are calculated at step S8310. At step S8310, the power consumption rates are calculated as the ratios of power consumptions for respective components of the virtual machine to the total power consumption of the virtual machine at a specific time.

Then, the power consumption changes for respective components of the virtual machine during a predetermined period of time are calculated at step S8320. The method for calculating the power consumption changes at step S8320 will be described in detail later with reference to FIG. 17.

Thereafter, the total power consumption of the virtual machine is calculated based on the initial power amount of the virtual machine, the power consumption rates for respective components, and the power consumption changes for respective components at step S8330. At step S8330, the total power consumption is calculated by multiplying the power consumption rates calculated for respective components by the respective power consumption changes, summing the resultant values, and then adding the initial power amount of the virtual machine to the summed value.

The total power consumption of the server is predicted by adding the total power consumption of the virtual machine to the amount of initial power of the server at step S8340. At step S8340, the total power consumption may be predicted as a value obtained by adding the total power consumption of the virtual machine to the amount of initial power of the server. Here, the power prediction unit 8150 calculates the amount of initial power of the server as the sum of the amount of power when the server is in a standby state, the amount of power when the server is in a sleep state, and the amount of power when the server is in an idle state.

Figure 17:
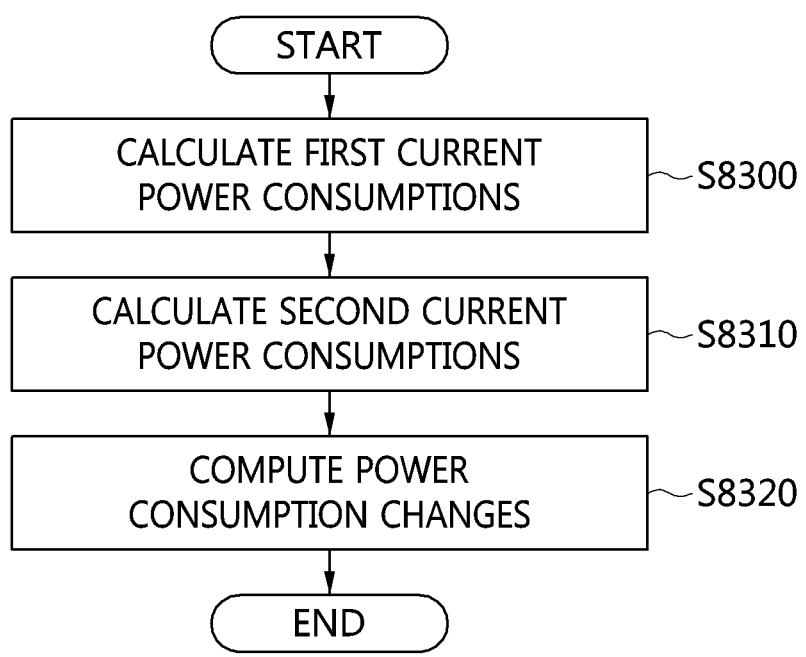
FIG. 17 is a diagram for explaining the step of calculating a power consumption change in the server power prediction method using a virtual machine according to the present invention.

FIG. 17 is a diagram for explaining the step of calculating power consumption changes for respective components in the server power prediction method using a virtual machine according to the present invention.

Referring to FIG. 17, the step of calculating power consumption changes for respective components calculates first current power consumptions for respective components of the virtual machine at a specific time at step S8400.

Then, second current power consumptions for respective components of the virtual machine after a predetermined period of time has elapsed from the specific time are calculated at step S8410.

Next, the power consumption changes corresponding to the differences between the second current power consumptions and the first current power consumptions for respective components of the virtual machine are calculated at step S8420.

In this way, the server power prediction apparatus and method using a virtual machine according to the present invention may predict the total power consumption of the server based on the total power consumption of the virtual machine, which is calculated using the power consumption rates and power consumption changes for respective components of the virtual machine, thus enabling a change or transition in the overall amount of power consumed by the server to be rapidly predicted without requiring a hard disk for calculating the actual power of the server.

As described above, in accordance with the present invention, there is an advantage in that architecture capable of efficiently providing virtual desktop service may be provided.

In accordance with the present invention, there is an advantage in that a DaaS system having a virtual desktop manager and a client device is used, and thus architecture capable of efficiently providing virtual desktop service may be provided.

In accordance with the present invention, a DaaS system having a virtual desktop manager and a client device is used, so that efficient management is possible using a multi-PC system based on desktop virtualization, and the present invention is easily applicable to the system and is also applicable to existing virtualization systems.

In accordance with the present invention, after power is applied to a client system, direct access to virtual desktop service is possible, and the power of the client system is shut off when the virtual machine of the virtual desktop service is terminated, thus providing an environment in which users may be provided with virtual desktop service without being aware of the operating system and virtual desktop client software on which the client runs.

In accordance with the present invention, a user OS image and a user disk image, which are to be allocated to the user for virtual desktop service, may be provided within a short period of time.

Further, since a previously prepared image disk is allocated, the number of operations, such as the generation of virtual machines and the copying of images, may be reduced, and thus the load on the server may be greatly alleviated in a server virtualization environment.

In accordance with the present invention, virtual desktop service meeting a user's requirement is provided to the user, thus distributing loads on a server and minimizing the power consumption of the server. That is, in an environment in which virtualization servers for providing virtual desktop service are locally distributed, virtual machines may be assigned to the virtualization server having the shortest network delay based on the network distances from the virtualization servers to the user.

In accordance with the present invention, the power consumptions of virtualization servers are predicted depending on the type of usage in which virtual machines are used by the user, after which a suitable virtualization server may be selected from among the virtualization servers based on the results of the prediction.

In accordance with the present invention, the virtual desktop service system and a virtual desktop service provision method using the system may dynamically allocate network resources in a server virtualization environment which uses a network card to which virtualization-supporting architecture using hardware is applied, thus further improving network I/O performance.

In accordance with the present invention, the server power prediction apparatus and method using a virtual machine are advantageous in that the total power consumption of a server is predicted based on the total power consumption of the virtual machine, which is calculated using the power consumption rates and power consumption changes for respective components of the virtual machine, thus enabling a change or transition in the overall amount of power consumed by the server to be rapidly predicted without requiring a hard disk for calculating the actual power of the server.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for a virtual desktop service, comprising:
a hardware processor configured to:
    assign a virtual machine to a user terminal that uses the virtual desktop service;
    allocate software resources to the virtual machine, wherein the software resources include an operating system (OS), applications, and user profiles; and
    support hardware resources including a central processor unit (CPU) and a memory,
wherein the user profiles are information including at least one of hardware configuration for users and computing environment information for the users,
wherein the hardware processor coordinates a delivery protocol used between the user terminal and servers that provide the virtual desktop service,
wherein the apparatus provides a management function,
wherein the management function is based on usage pattern information about a user's average usage of the software resources or the hardware resources,
wherein the management function uses a physical distance on network from the user terminal to a server on a shortest path among the servers to provide the virtual desktop service to the user terminal, or the management function considers power consumption according to a resource usage of the user terminal,
wherein when the user terminal performs tasks and requests the virtual desktop service, the management function allocates the virtual desktop service based on a classified group of users, the classified group being related to the user profiles;

wherein a caching process based on the tasks is used for utilizing applications, tasks, and usage patterns of the classified group of users, and wherein the classified group of users being assigned to the same virtualization server among the servers share the resources by the caching process, wherein the management function calculates power consumption information according to weighted resource usages for respective components of the virtual machine while executing the tasks, and the power consumption information is estimated by a sum of the weighted resource usages, wherein the management function periodically monitors the resource usage while executing the tasks and dynamically provides the software or hardware resources to the virtual machine according to a reference value of the resource usage when the resources are insufficient or overloaded, wherein based on the power consumption information, the management function increases performance on network connection with the user terminal by allocating a network interface to the virtual machine, wherein the network interface includes a virtual network interface.

2. The apparatus of claim 1, wherein the hardware processor provides environment files to the user terminal, the environment files including an image of operating system (OS) which corresponds to a requirement configured by the user terminal, and wherein the environmental files are prepared in advance when the virtual desktop service is provided.

3. The apparatus of claim 2, wherein the hardware processor supports high availability (HA) with predefined configuration parameters.

4. The apparatus of claim 3, wherein a plurality of virtual machines in the servers is generated over a single hypervisor.

5. The apparatus of claim 4, wherein the delivery protocol is used to encapsulate and deliver access to an entire information system environment or access to the user terminal over a network.

6. A method of providing a virtual desktop service, the method comprising:

checking user profiles of a user terminal for the virtual desktop service and determining a virtual machine suitable for hardware of the user terminal according to the user profiles;

requesting a virtual machine infrastructure to generate a corresponding virtual machine if the suitable virtual machine is not present, applying the user profiles to a corresponding virtual machine if the suitable virtual machine is present, and generating a virtual desktop; and sending connection information for sending the generated virtual desktop to the user terminal and sending the virtual desktop to the user terminal using a delivery protocol of the virtual desktop, wherein the user profiles are information including at least one of hardware configuration for users and computing environment information for the users, wherein software resources are allocated to the virtual desktop by the virtual desktop service, wherein the software resources include an operating system (OS), applications, and the user profiles, wherein hardware resources supported by the virtual desktop service include a central processor unit (CPU) and a memory, wherein a delivery protocol used between the user terminal and servers that provide the virtual desktop service is coordinated, wherein a hardware processor performing the virtual desktop service method provides a management function, wherein the management function is based on usage pattern information about a user's average usage of the software resources or the hardware resources, wherein the management function uses a physical distance on network from the user terminal to a server on a shortest path among the servers to provide the virtual desktop service to the user terminal, or the management function considers power consumption according to a resource usage of the user terminal, wherein when the user terminal performs tasks and requests the virtual desktop service, the management function allocates the virtual desktop service based on a classified group of users, the classified group being related to the user profiles;

wherein a caching process based on the tasks is used for utilizing applications, tasks and usage patterns of the classified group of users, wherein the classified group of users are assigned to the same virtualization infrastructure being generated with sharing the resources, wherein the management function calculates power consumption information according to weighted resource usages for respective components of the virtual desktop while executing the tasks, and the power consumption information is estimated by a sum of the weighted resource usages, wherein the management function periodically monitors the resource usage while executing the tasks and dynamically provides the software or hardware resources to the virtual machine according to a reference value of the resource usage when the resources are insufficient or overloaded, and wherein based on the power consumption information, the management function increases performance on network connection with the user terminal by allocating a network interface to the virtual machine, wherein the network interface includes a virtual network interface.

7. The method of claim 6, wherein environment files are provided to the user terminal, the environment files including an image of operating system (OS) which corresponds to a requirement configured by the user terminal, and the environmental files are prepared in advance when the virtual desktop service is provided.

8. The method of claim 7, wherein high availability (HA) with predefined configuration parameters is supported by the virtual desktop service.

9. The method of claim 8, wherein a plurality of virtual machines in the servers is generated over a single hypervisor.

10. The method of claim 9, wherein the delivery protocol is used to encapsulate and deliver access to an entire information system environment or access to the user terminal over a network.

11. The apparatus of claim 1, wherein the power consumption information includes information on power consumption amounts of a hard disk and a memory of the virtual machine.

12. The method of claim 6, wherein the power consumption information includes information on power consumption amounts of a hard disk and a memory of the virtual machine.

\* \* \* \* \*